United States Patent
Imai et al.

(10) Patent No.: US 12,367,689 B2
(45) Date of Patent: Jul. 22, 2025

(54) INFORMATION PROCESSING APPARATUS, INFORMATION PROCESSING METHOD, AND RECORDING MEDIUM

(71) Applicant: CANON KABUSHIKI KAISHA, Tokyo (JP)

(72) Inventors: Ayato Imai, Tokyo (JP); Masakazu Fujiki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 484 days.

(21) Appl. No.: 17/306,764

(22) Filed: May 3, 2021

(65) Prior Publication Data
US 2021/0348927 A1    Nov. 11, 2021

(30) Foreign Application Priority Data
May 8, 2020    (JP) .................................. 2020-082424

(51) Int. Cl.
*G06V 20/64*    (2022.01)
*G06T 7/73*    (2017.01)
*G06V 20/56*    (2022.01)

(52) U.S. Cl.
CPC ................ *G06V 20/64* (2022.01); *G06T 7/73* (2017.01); *G06V 20/56* (2022.01);
(Continued)

(58) Field of Classification Search
CPC .......... G06V 20/64; G06V 20/56; G06T 7/73; G06T 2207/10028; G06T 2207/20081;
(Continued)

(56) References Cited

U.S. PATENT DOCUMENTS

| 7,003,136 | B1 * | 2/2006 | Harville | G06V 20/64 |
| | | | | 382/209 |
| 8,294,754 | B2 * | 10/2012 | Jung | H04N 13/178 |
| | | | | 348/46 |

(Continued)

FOREIGN PATENT DOCUMENTS

| JP | 2013200604 A | 10/2013 |
| JP | 2014191796 A | * 10/2014 |

(Continued)

OTHER PUBLICATIONS

Tian, Pengju, et al. "Robust segmentation of building planar features from unorganized point cloud." IEEE Access 8 (2020): 30873-30884. (Year: 2020).*

(Continued)

*Primary Examiner* — Stephen R Koziol
*Assistant Examiner* — Benedict E Lee
(74) *Attorney, Agent, or Firm* — Canon U.S.A., Inc. IP Division

(57) ABSTRACT

An information processing apparatus includes an acquisition unit configured to acquire a feature point cloud indicating a three-dimensional shape of an environment where a moving object travels, and an output unit configured to output a two-dimensional map indicating positions of feature points on a two-dimensional plane excluding feature points that represent a feature of a ceiling in the environment or a travel surface of the moving object from the feature point cloud.

14 Claims, 18 Drawing Sheets

(52) U.S. Cl.
CPC .............. *G06T 2207/10028* (2013.01); *G06T 2207/20081* (2013.01); *G06T 2207/30252* (2013.01)

(58) Field of Classification Search
CPC ........... G06T 2207/30252; G06T 2207/20084; G01C 21/20; G01C 21/206
See application file for complete search history.

(56) References Cited

U.S. PATENT DOCUMENTS

| | | | |
|---|---|---|---|
| 9,285,805 B1* | 3/2016 | Pollock | G06V 20/56 |
| 9,323,999 B2* | 4/2016 | Akimoto | G06V 10/446 |
| 10,657,691 B2* | 5/2020 | Zweigle | G06F 18/2413 |
| 10,769,421 B2* | 9/2020 | Hua | G06V 20/58 |
| 10,809,073 B2* | 10/2020 | He | G06V 20/588 |
| 10,846,511 B2* | 11/2020 | Ozkucur | G01C 21/30 |
| 10,930,000 B2* | 2/2021 | Liu | G06V 10/50 |
| 11,217,012 B2* | 1/2022 | Urtasun | G06V 20/582 |
| 11,314,262 B2* | 4/2022 | Zhang | G05D 1/0219 |
| 11,481,920 B2* | 10/2022 | Otani | H04N 23/90 |
| 11,494,985 B2* | 11/2022 | Coddington | G06F 18/251 |
| 11,580,663 B2* | 2/2023 | Kanetake | G06T 7/73 |
| 2013/0202197 A1* | 8/2013 | Reeler | G06T 7/20 |
| | | | 382/154 |
| 2015/0063683 A1* | 3/2015 | Fu | G06V 20/64 |
| | | | 382/154 |
| 2016/0203387 A1* | 7/2016 | Lee | G06T 3/00 |
| | | | 348/44 |
| 2020/0286282 A1* | 9/2020 | Grant | G06V 20/647 |
| 2021/0326614 A1* | 10/2021 | Zhao | G06V 20/597 |
| 2022/0009552 A1* | 1/2022 | Sakai | G06V 20/586 |
| 2022/0076453 A1* | 3/2022 | Sakano | H04N 17/002 |
| 2022/0148138 A1* | 5/2022 | Nakayama | H04N 23/698 |

FOREIGN PATENT DOCUMENTS

| | | | | |
|---|---|---|---|---|
| JP | 6080462 B2 | * | 2/2017 | |
| JP | 6335389 B2 | | 5/2018 | |
| JP | 2019125345 A | | 7/2019 | |
| JP | 2019179495 A | * | 10/2019 | |
| JP | 2020030466 A | * | 2/2020 | |
| KR | 20040100411 A | * | 12/2004 | |
| WO | WO-2016130719 A2 | * | 8/2016 | ............ B60W 30/10 |
| WO | 2017/188292 A1 | | 11/2017 | |

OTHER PUBLICATIONS

Yuhua et al. "A new reduction algorithm of scattered point cloud data." 2010 3rd International Conference on Advanced Computer Theory and Engineering (ICACTE). vol. 6. IEEE, 2010. (Year: 2010).*

Rusu, Radu Bogdan, et al. "Towards 3D point cloud based object maps for household environments." Robotics and Autonomous Systems 56.11 (2008): 927-941. (Year: 2008).*

* cited by examiner

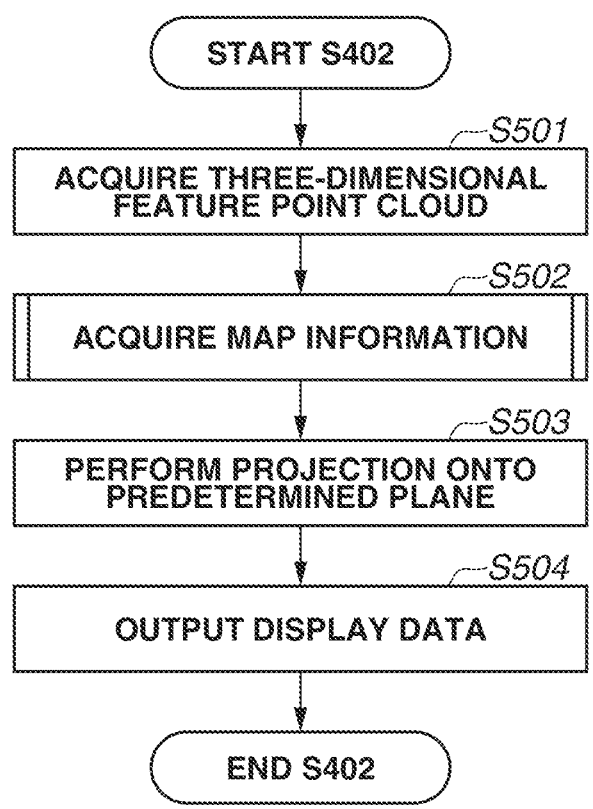

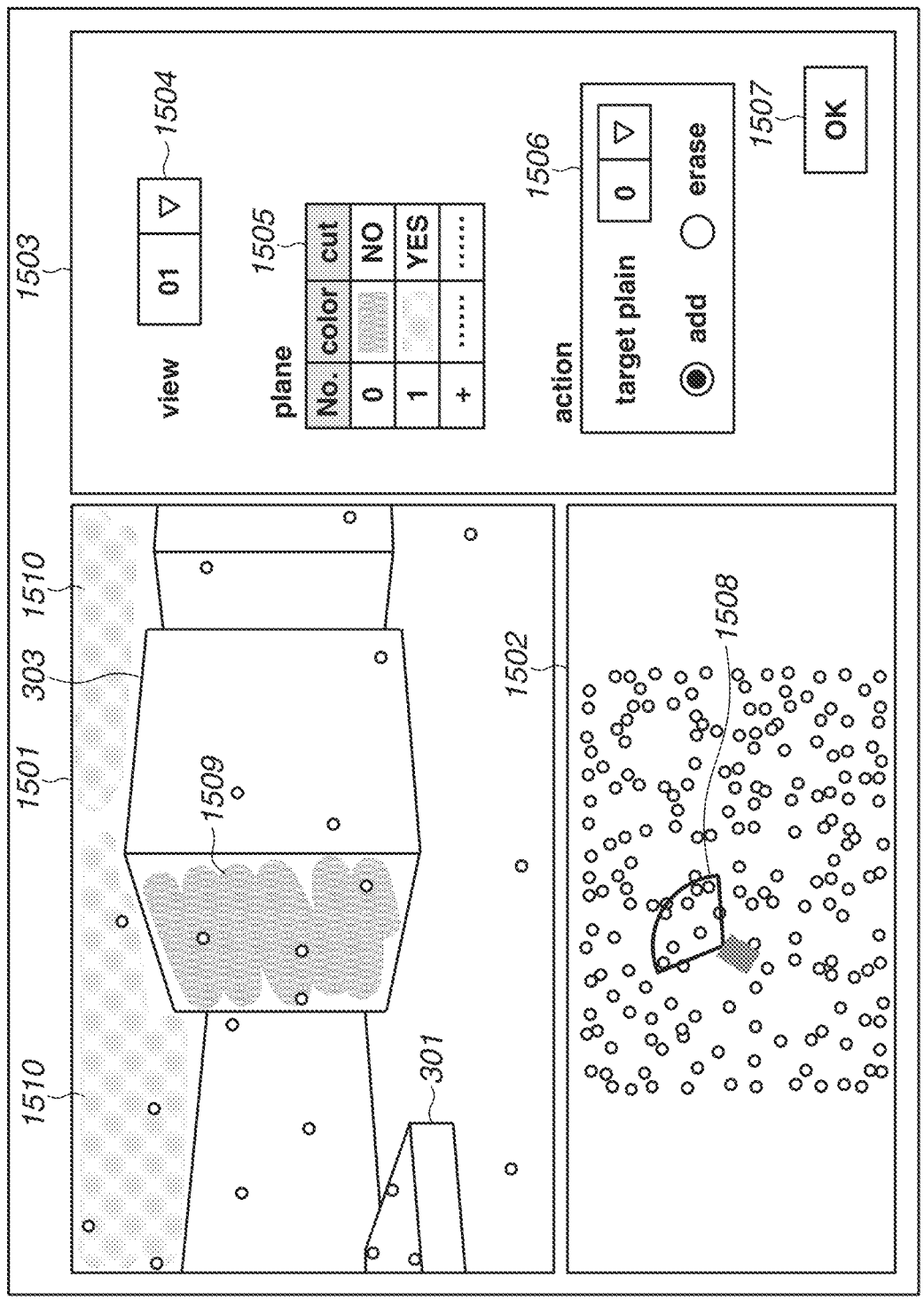

FIG.18
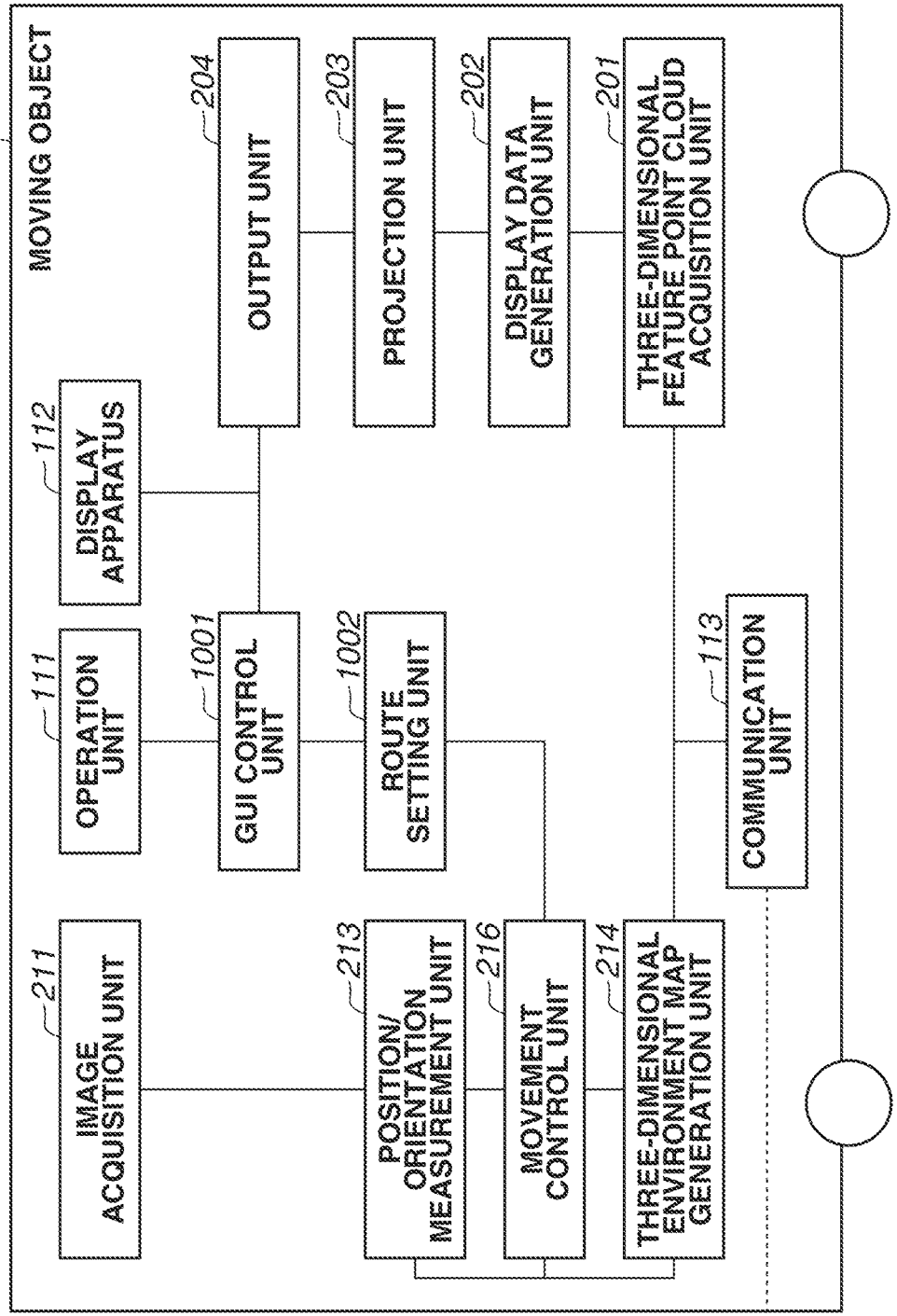
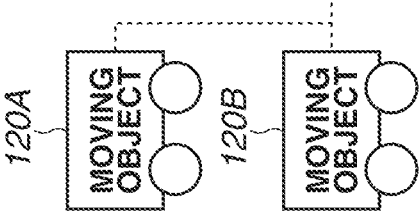

INFORMATION PROCESSING APPARATUS, INFORMATION PROCESSING METHOD, AND RECORDING MEDIUM

BACKGROUND

Field of the Disclosure

The present disclosure relates to a technique for estimating positions of a moving object.

Description of the Related Art

Moving robots such as automated guided vehicles (hereinafter, referred to as "AGVs") are used in factories and logistics warehouses. A known technique for estimating the current position and orientation of an AGV is a simultaneous localization and mapping (SLAM) technique using cameras or laser range scanners as sensors. For example, WO 2017/188292 discusses a system that generates an environmental map on a horizontal plane of a travel area by a SLAM technique using a laser range scanner. The generated environmental map is displayed on a graphical user interface (GUI), and a travel route of an AGV is set. Japanese Patent No. 6335389 discusses a technique for generating a point cloud image. Specifically, a laser scanner of the vehicle emits laser light to nearby objects. Three-dimensional point cloud data is generated from measurement values that indicate the distances between the laser scanner and the nearby objects and orientations, and the three-dimensional point cloud data is projected onto a two-dimensional plane as a point cloud image based on a line-of-sight position and a line-of-sight orientation that are designated by a user. Each of the methods discussed in WO 2017/188292 and Japanese Patent Application No. 6335389 displays all the feature points of an observed three-dimensional feature point cloud on a two-dimensional image, and this sometimes makes it difficult to visually recognize positions of features for setting routes.

SUMMARY

To overcome the above-described issue, embodiments of the present disclosure are directed to an information processing apparatus that displays three-dimensional measurement results measured by a moving object including a three-dimensional measurement apparatus so that a user can view the displayed three-dimensional measurement results with ease.

According to embodiments of the present disclosure, an information processing apparatus includes an acquisition unit configured to acquire a feature point cloud indicating a three-dimensional shape of an environment where a moving object travels, and an output unit configured to output a two-dimensional map indicating positions of feature points on a two-dimensional plane excluding feature points that represent a feature of a ceiling in the environment or a travel surface of the moving object from the feature point cloud.

Further features of the present disclosure will become apparent from the following description of exemplary embodiments with reference to the attached drawings.

BRIEF DESCRIPTION OF THE DRAWINGS

FIG. 5 is a flowchart illustrating a process that is operated by an output unit.

FIG. 15 illustrates an example of a GUI.

FIG. 18 is a block diagram illustrating an example of a functional configuration of an information processing system.

DESCRIPTION OF THE EMBODIMENTS

Figure 1:
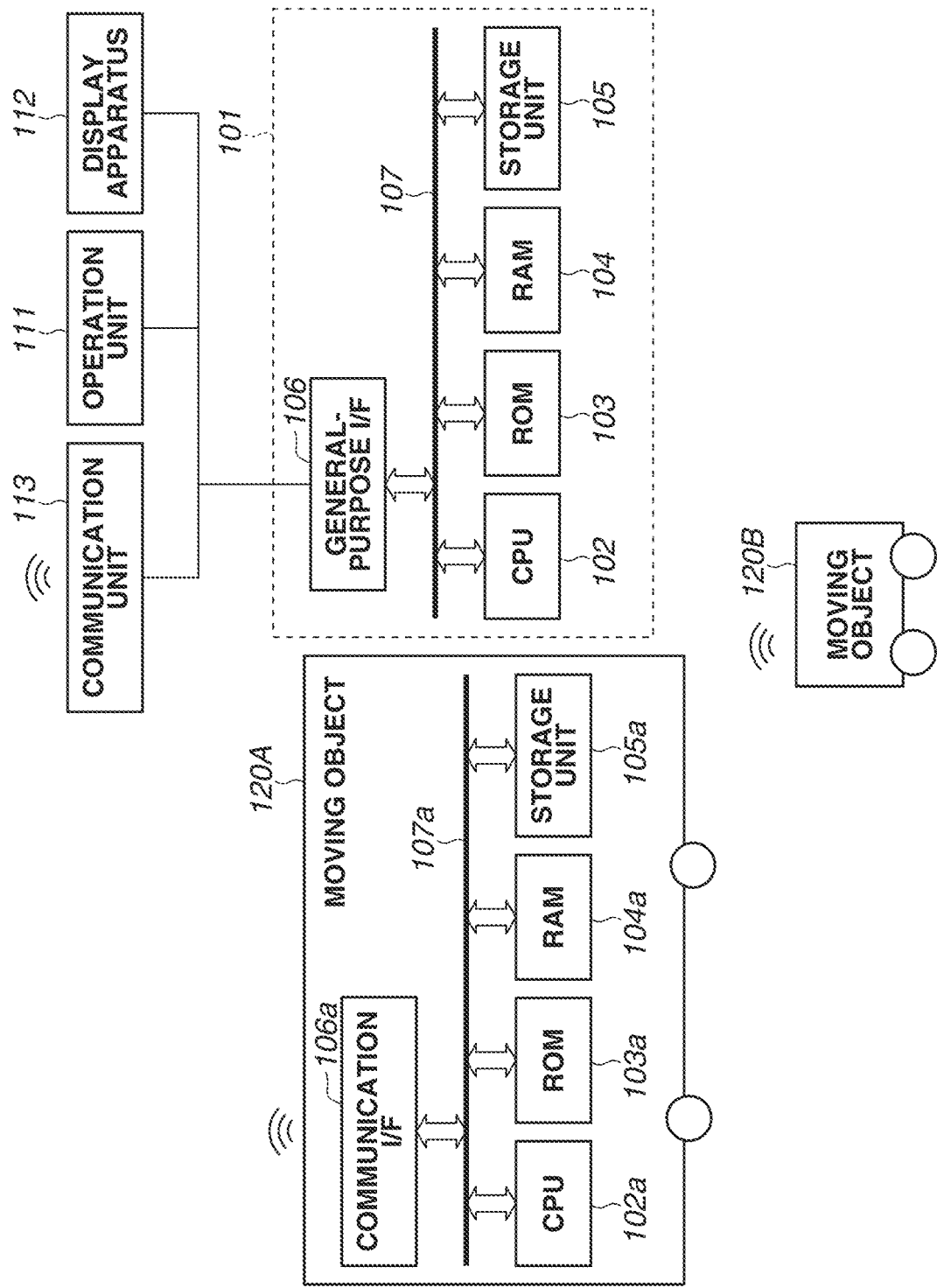
FIG. 1 is a block diagram illustrating an example of a hardware configuration of an information processing apparatus.

Various exemplary embodiments of the present disclosure will be described in detail below with reference to the drawings. It should be noted that the exemplary embodiments described herein are not intended to limit the disclosure and that not every combination of features described in the exemplary embodiments is always used.

An information processing apparatus according to a first exemplary embodiment of the present disclosure will be described in detail below with reference to the drawings. In the present exemplary embodiment, an autonomous vehicle (hereinafter, referred to as "moving object") with sensors (e.g., stereo camera) capable of measuring nearby shapes measures the environment around the moving object using the sensors to estimate the position of the moving object. The moving object travels to a destination that is set in advance by a user on an environment map indicating feature point positions in the environment. The environment map described here is basically a map for use in calculating the position of the moving object by the information processing apparatus, and the environment map indicates three-dimensional positions of feature points in the environment (real space where the moving object moves). The user can refer to the environment map via a graphical user interface (GUI). The nearby shapes measured by the moving object are displayable as three-dimensional feature points (hereinafter, referred to as "point cloud data") on a display apparatus connected to the information processing apparatus. A map generated with all the three-dimensional point cloud data simply plotted on a two-dimensional coordinate system is as illustrated in, for example, FIG. 6A, and this is not visually distinguishable for the user in a map. Further, a map generated with the point cloud data projected onto the environment map as illustrated in FIG. 6B is also not visually distinguishable for the user because the map contains excessive point cloud data such as ceiling shapes. Specifically, since a ceiling or a floor is typically included in a structure that forms a specific closed space, feature points indicating the ceiling or the floor are distributed on a plane at a predetermined level (i.e., the height of the floor or the ceiling) from the plane on which the moving object travels. To display an image (i.e., a map with the moving object overlooked) indicating a travel range of the moving object, the three-dimensional feature points are projected onto the plane on which the moving object travels. Feature points different in the height direction (defined as a Z-axis) but the same in the directions (defined as X-axis and Y-axis directions) forming the plane on which the moving object travels are projected at the same position. Thus, feature points indicating other still objects such as walls or furniture may be projected at the same positions as feature points indicating the floor or the ceiling. On a resulting map, it is difficult to recognize the positions of surfaces (edge points) of walls and still objects. Especially when the vehicle travels in a room, many observed points of the ceiling and the floor are projected onto a two-dimensional image, and this sometimes makes it difficult to distinguish the feature points of structures (obstacles in the environment) from the ceiling and the floor. Thus, in the first exemplary embodiment, display data from which the user can intuitively recognize positions in the environment is generated using data effective for a map the user views of the point cloud data in the environment map for use by the moving object, and the generated display data is displayed on the display apparatus. Furthermore, the current position of the moving object that is traveling is superimposed and displayed in real time on the display data on the display apparatus so that the user can recognize the current position of the moving object with ease.

<Configurations of Information Processing Apparatus and Information Processing System>

FIG. 1 is a diagram illustrating an example of a hardware configuration of an information processing apparatus 101 and a moving object 120 according to the present exemplary embodiment. The information processing apparatus 101 has the functionality of a general personal computer (PC) and includes a central processing unit (CPU) 102, a read-only memory (ROM) 103, a random access memory (RAM) 104, a storage unit 105, such as a hard disk drive (HDD) or a solid state drive (SSD), a general-purpose interface (I/F) 106, and a system bus 107. The CPU 102 runs an operating system (OS) and various programs stored on the ROM 103 or the storage unit 105 using the RAM 104 as a work memory and controls each component via the system bus 107. For example, the programs that are run by the CPU 102 include programs for operating processes described below. Further, the information processing apparatus 101 is connected to an operation unit 111, such as a keyboard, a display apparatus 112, such as a display, and a communication unit 113 via the general-purpose I/F 106, which constitute an information processing system 110. Further, the information processing system 110 is network-connected to one or more moving objects 120 (120A) via the communication unit 113. The moving objects 120A and 120B are each an automated guided vehicle (AGV) capable of generating a three-dimensional environment map and autonomously traveling in the three-dimensional environment map. The moving object 120A is connected to a CPU 102a, a ROM 103a, a RAM 104a, a storage unit 105a, and a communication I/F 106a via a bus 107a as in the information processing apparatus 101. The moving object 120A wirelessly communicates with the information processing apparatus 101 and other moving objects 120 via the communication I/F 106a.

The information processing system 110 uses the functionality of the information processing apparatus 101 and presents information about the moving object 120A acquired via the communication unit 113 to the user by displaying the information on the display apparatus 112. Further, the information processing system 110 has the role of providing user instructions to the moving object 120A via the operation unit 111. Detailed descriptions thereof are omitted in the present exemplary embodiment.

<Logical Configuration of Information Processing Apparatus>

Figure 2:
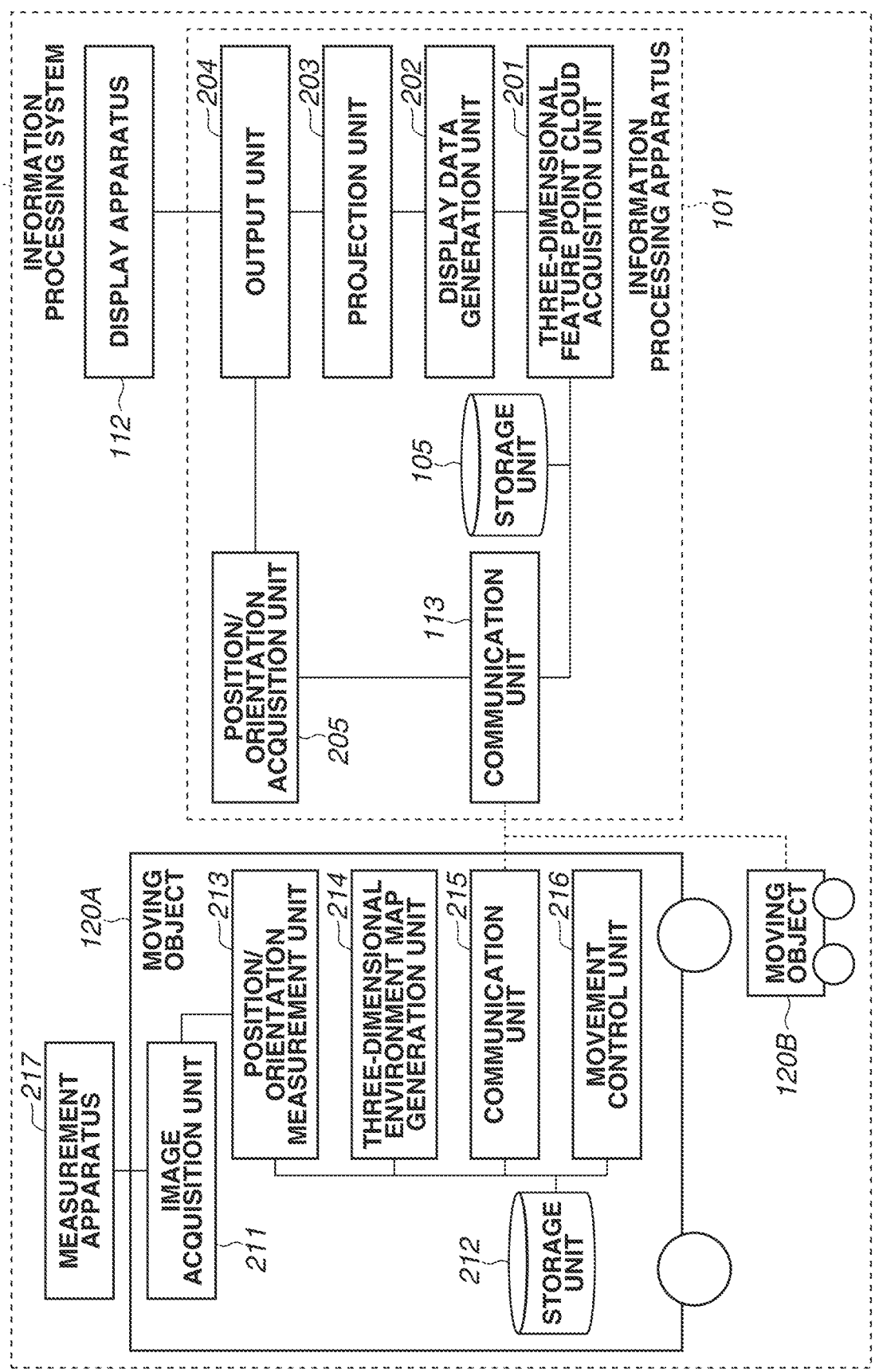
FIG. 2 is a block diagram illustrating an example of a functional configuration of an information processing system.

A logical configuration of the information processing apparatus 101 according to the present exemplary embodiment will be described. The CPU 102 loads a computer program from the ROM 103 onto the RAM 104 and runs the loaded program to thereby operate each process of the following components as software. FIG. 2 is a block diagram illustrating a logical configuration of the information processing apparatus 101, the information processing system 110, and the moving object 120A.

A three-dimensional feature point cloud acquisition unit 201 acquires feature points that are measured by a three-dimensional measurement apparatus of the moving object 120A and that represent the shape of the environment where the moving object 120A travels. For example, the three-dimensional feature point cloud acquisition unit 201 acquires feature point cloud data stored on the storage unit 105 or the moving object 120A. The three-dimensional feature point cloud acquisition unit 201 reads a three-dimensional environment map stored on the storage unit 105 and acquires feature point cloud data in the environment map. Details of the environment map will be described below.

A display data generation unit 202 generates feature points representing positions of feature points indicating edge portions and boundaries of obstacles to the moving object 120A in the environment from a part of the acquired feature point cloud. Whether an object can become an obstacle to the moving object 120A is determined by the height of the moving object 120A. Other features such as ceilings and floors are determined as objects that are not obstacles. Three-dimensional data for screen display excluding the feature points indicating the positions of ceilings and floors is generated based on the feature point cloud data.

A projection unit 203 projects a map on which the positions of the feature points indicating the edge portions and the boundaries of the obstacles to the moving object 120A in the environment are specified on a predetermined plane in the environment. Specifically, the projection unit 203 converts the three-dimensional data for screen display into two-dimensional data projected onto the predetermined plane. The feature point cloud is projected onto the predetermined plane that is the plane (travel plane) on which the moving object travels. This provides a travelable range of the moving object 120A on the map.

An output unit 204 outputs the positions of feature points indicating edge portions of objects that will become obstacles to the moving object 120A traveling in the environment in a map on the predetermined plane in the environment based on some corresponding points of the feature points. The boundaries includes, specifically, boundaries of walls, windows, or objects (furniture) with other objects and separate the space where the moving object 120A travels. As a part of the three-dimensional feature point cloud on the environment map represents the positions of the boundaries, the feature points except for the feature points indicating floors and ceiling are output by the output unit 204. Furthermore, the projection unit 203 converts various data such as the generated two-dimensional data into image data that will be displayed on the display apparatus 112. A position/orientation acquisition unit 205 acquires the data about real-time positions and orientations measured by a position/orientation measurement unit 213 of the moving objects 120A and 120B, which are network-connected, via the communication unit 113. In other embodiments, the position/orientation acquisition unit 205 can acquire a result of self-position estimation on a device of the moving object 120. The position of the moving object 120 can be estimated using an existing technique. A method of estimating the position of the moving object 120 will be described below in the descriptions of the position/orientation measurement unit 213. In another method, for example, features (markers and light emitting diode (LED) light) of the moving object 120 may be detected from an image captured by an objective camera, and the features are used to identify a position in the environment map.

<Logical Configuration of Moving Object>

Next, a logical configuration of the moving object 120A connected to the information processing apparatus 101 according to the present exemplary embodiment will be described. The moving object 120B is a separate object having the same configuration as that of the moving object 120A. It is assumed that the same environment map is used.

A measurement apparatus 217 is included in the moving object 120A and measures the environment around the moving object 120A as a three-dimensional feature. The measurement apparatus 217 is, for example, an image capturing apparatus (camera) or a range sensor. In the present exemplary embodiment, the image capturing apparatus is used as the measurement apparatus 217 and captures images of the environment around the moving object 120A. The captured images are transmitted to an image acquisition unit 211. The measurement apparatus 217 is, for example, a camera that acquires gray-scale or color luminance images, a depth camera, or a three-dimensional light detection and ranging (three-dimensional LiDAR) apparatus. Further, a stereo camera may be used, or a plurality of cameras may be arranged to face the directions of the moving object 120A. In the present exemplary embodiment, a stereo camera that can acquire gray-scale luminance images is used, fixed in the front direction of the moving object 120A.

The image acquisition unit 211 acquires measurement data (image) on the environment around the moving object 120A measured by the measurement apparatus 217. Specifically, the image acquisition unit 211 acquires luminance images and depth images of the surroundings of the moving object 120A in digital data. A range image with each pixel indicating a distance value may be acquired using a stereo camera or a range sensor.

A storage unit 212 stores the environment map and route information for use by the moving object 120A. For example, the storage unit 212 stores feature points that are measured by the measurement apparatus 217 and that indicate the shape of the environment as the environment map. The environment map is generated using the feature point cloud measured in advance.

The position/orientation measurement unit 213 measures the current position and orientation of the moving object 120A on the environment map based on the images acquired by the image acquisition unit 211 and the environment map. As used here, the term "position and orientation" refers to six-degree-of-freedom information consisting of the combination of coordinates and rotations in the three-dimensional space.

A three-dimensional environment map generation unit 214 generates the environment map usable by the position/orientation measurement unit 213 based on images continuously acquired by the image acquisition unit 211 on the moving object 120A traveling in the environment.

In the present exemplary embodiment, the processes of the position/orientation measurement unit 213 and the three-dimensional environment map generation unit 214 are implemented using a known simultaneous localization and mapping (SLAM) technique using stereo images (e.g., Mur-Artal, ORB-SLAM2: an Open-Source SLAM System for Monocular, Stereo and RGB-D Cameras. IEEE. 2017.). In visual SLAM, the camera on the moving object 120A continuously captures images. Then, feature points on the image plane are extracted from the images at the respective time points, and the coordinates of the feature points and the position and orientation of the camera in the three-dimensional space are simultaneously and continuously estimated based on the corresponding feature points on the image plane of images of its stereo pair or an image at another recent time point. The estimated feature points in the three-dimensional space are registered in the below-described environment map as appropriate and are used in estimating the position and orientation of the camera at a time point thereafter.

A communication unit 215 is network-connected to various apparatuses in the information processing system 110 and transmits and receives various types of data. The various types of data include the feature points measured by the measurement apparatus 217, the environment map, and position/orientation information about the moving object 120A. All or only effective feature points except for the feature points indicating ceilings or floors of the feature points registered in the three-dimensional map may be transmitted to the information processing apparatus 101. How to select feature points to be sent is determined similarly to a process executed by the display data generation unit 202 described below.

A movement control unit 216 drives a moving unit (tires) to move the moving object 120A based on the current position and orientation measured by the position/orientation measurement unit 213 and the route information. In some embodiments, the movement control unit 216 directly acquires an instruction to move forward, move backward, turn, or stop from the user via an interface (not illustrated) to move the moving object 120A. The moving unit includes, for example, two or more tires, one or more of which are coupled to the power, and the moving object 120A travels on a floor that is a substantially flat surface. The three-dimensional feature points are projected on the predetermined plane based on the floor surface on which the moving object 120A travels. This provides to the user a highly visible display of the edge portions and boundaries (wall positions) of obstacles in the environment and the travel route.

<Travel Environment of Moving Object>

Figure 3:
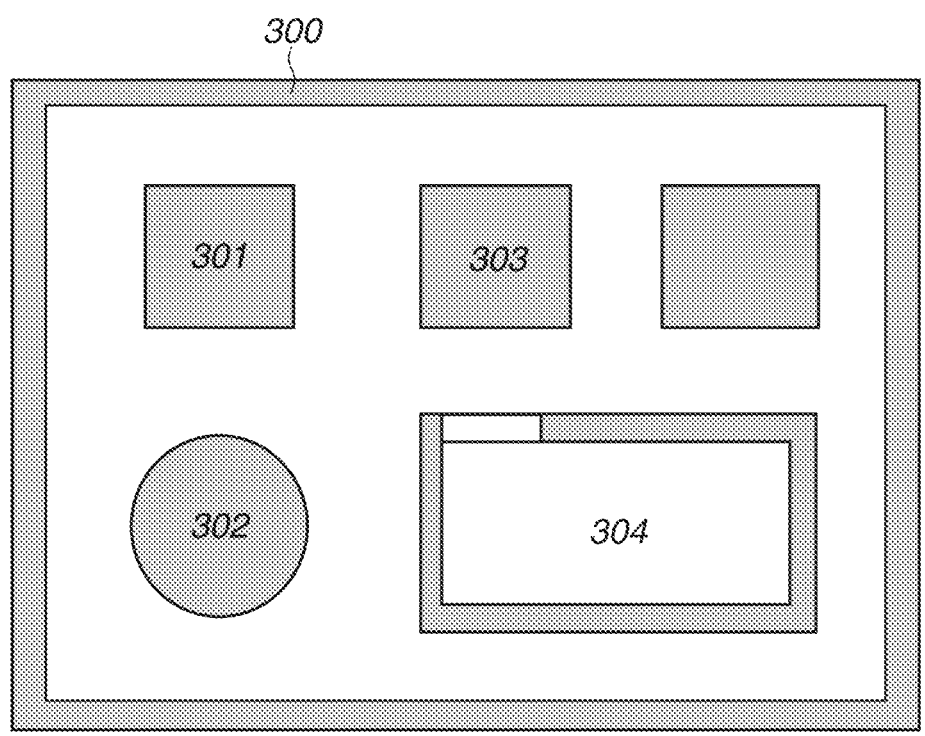
FIG. 3 illustrates an example of a travel environment of a moving object and a map image.

FIG. 3 is a schematic diagram illustrating a layout of a horizontal plane of an environment 300, which will be referred to in the following descriptions of processes. In FIG. 3, each gray region is an obstacle such as a wall, whereas the white regions are travelable, horizontal floor surfaces. The environment is in a room and is covered with a horizontal ceiling at a predetermined height. An object 301 is an object (specifically, a bump or a step) that is too tall for the moving object 120A to jump over by itself and travel, as an example of an object. The top surface of the obstacle and the ceiling above the obstacle are observable from the image acquisition unit 211 of the moving object 120A that is traveling (the moving object 120A is able to travel over a small dent such as a door rail). An object 302 is a circular column, whereas an object 303 is a column having a rectangular cross-section. A region 304 is a room surrounded by a relatively thin wall, and the moving object 120A can enter the region 304. The columns 302 and 303 and the wall 304 extend perpendicularly from the floor to the ceiling. Further, for convenience of description, feature points of edge portions of transparent objects such as windows or glass in the environment 300 will be described as being detectable.

<Environment Map>

The environment map used in the present exemplary embodiment is (two- or three-dimensional) data generatable or usable in a known visual SLAM process. The environment map contains a discrete feature point cloud in the three-dimensional space and a plurality of discrete keyframes (describing the corresponding relationship between images captured in the environment, camera parameters during the image capturing, and a feature point cloud in the three-dimensional space observed from the images). Further, the camera parameters include an external parameter and an internal parameter. The external parameter describes the position and orientation of the camera, and the internal parameter describes an angle of view and distortion characteristics of an optical system of the camera.

In the present exemplary embodiment, the stereo camera in the image acquisition unit 211 acquires gray-scale images, and gray-scale images and camera parameters that correspond to the right stereo camera and gray-scale images and camera parameters that correspond to the left stereo camera are stored per keyframe. As to the external parameter, for example, a method may be used that stores only the position and the orientation at an image capturing by the left camera to calculate the position and the orientation of the right camera based on the relative position and orientation with respect to the left camera.

The environment map is generated as follows. For example, with the three-dimensional environment map generation unit 214 on the moving object 120A activated, the user manually operates to move the moving object 120A across the entire region in the environment where the moving object 120A is to travel autonomously, whereby the environment map is generated. With the moving object 120A traveling on a horizontal floor surface as in the present exemplary embodiment, a horizontal plane (floor surface) is estimated through plane approximation of a position history of the moving object 120A in the environment map generation. The horizontal plane may be estimated by capturing images of markers that have known orientations and have relative orientations with respect to the camera acquirable from the images. In some embodiments, an acceleration sensor embedded in the moving object 120A is used to acquire the horizontal plane based on data in the vertical direction acquired during rest.

<Process of Displaying Position and Orientation of Moving Object>

Next, a process of displaying three-dimensional information and a process of displaying the position and orientation of the moving object 120A in an information processing method using the information processing apparatus 101 according to the present exemplary embodiment will be described with reference to FIGS. 4 to 10. A procedure will be described for superimposing the current position of the moving object 120A traveling in a region of the generated environment map on display data generated based on a feature point cloud in the same environment map data.

Figure 4:
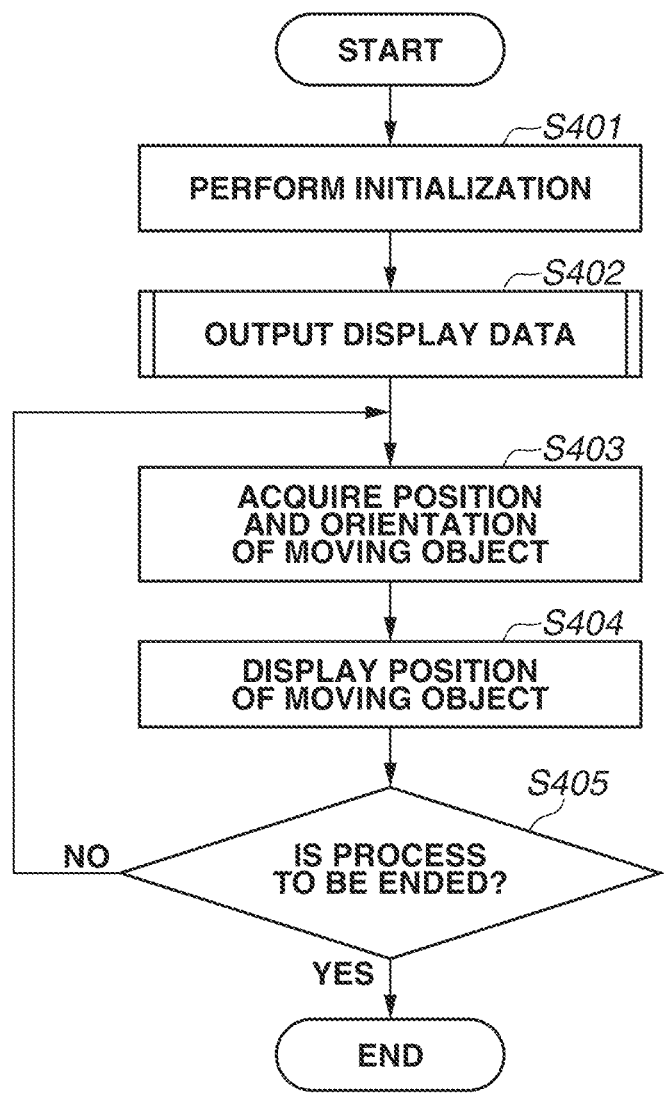
FIG. 4 is a flowchart illustrating a process that is operated by an information processing apparatus.

FIG. 4 is a flowchart illustrating a process operated by the information processing apparatus 101 according to the present exemplary embodiment. Hereinafter, each step will be described with the letter "S" at the beginning, instead of writing "step". The process illustrated in the flowchart in FIG. 4 is operated by the CPU 102 illustrated in FIG. 1, which is a computer, based on the computer program stored on the storage unit 105.

In step S401, the information processing apparatus 101 performs initialization. The information processing apparatus 101 starts as software, establishes communication with the moving object 120A via the communication unit 113, and copies the three-dimensional environment map data used by the moving object 120A to the storage unit 105. As described above, the three-dimensional environment map data contains discrete feature points in the three-dimensional space.

In step S402, the output unit 204 outputs a map indicating positions of feature points representing edge portions of objects that can be obstacles to the moving object 120A traveling in the environment on the predetermined plane in the environment based on some corresponding points of the feature points. Specifically, a process is operated of displaying three-dimensional information in a two-dimensional image form on the display apparatus 112, the three-dimensional information of which is generated for display from the feature point data in the environment map data stored in the storage unit 105. The process of step S402 is a core part of the present exemplary embodiment, so that details thereof will be described below.

Subsequent steps S403 to S405 are a process that is iteratively operated in real time as the moving object 120A moves.

In step S403, the position/orientation acquisition unit 205 acquires the data about the position and orientation of the moving object 120A based on the measurement data about the environment and the environment map. In the present exemplary embodiment, the information processing apparatus 101 acquires data about a position and an orientation of the moving object 120A that are estimated from images captured by the moving object 120A using the SLAM method. A method of estimating a position and an orientation using stereo images uses the SLAM technique as with the position/orientation measurement unit 213 described above. In some embodiments, position/orientation information calculated by the moving object 120A is acquired via the communication unit 113.

Figure 9:
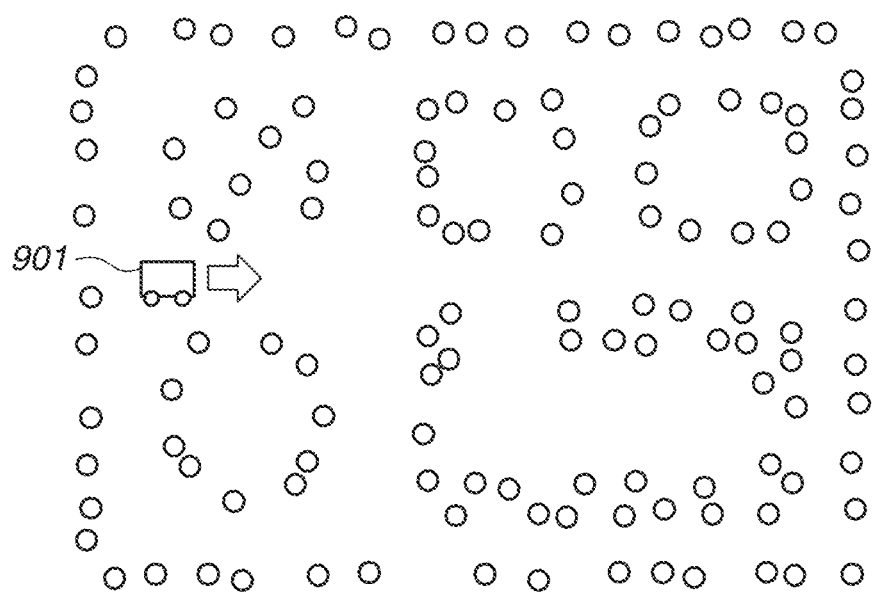
FIG. 9 illustrates an example of a display of position/orientation information.

In step S404, the output unit 204 outputs the map indicating positions of feature points representing edge portions of objects that can be obstacles to the moving object 120A moving in the environment on the predetermined plane in the environment, with the position/orientation information about the moving object 120A on the map. Specifically, the output unit 204 converts the six-degree-of-freedom position/orientation information acquired in step S403 into three-degree-of-freedom information indicating coordinates and an orientation on the horizontal plane, converts the coordinates and the orientation into image data from which the coordinates and the orientation are identifiable, and superimposes and displays the image data on the display data. FIG. 9 illustrates an example of a superimposed display result. A graphic object 901 indicates the position and orientation of the moving object 120A and indicates that the current position of the moving object 120A is between the object 301 and the circular column 302 and faces rightward in FIG. 9.

Step S405 is a branch to determine whether to end or continue the process of displaying a position and an orientation. For example, if an instruction to end the process is received from the user or if continuously displaying the position/orientation information is difficult due to deterioration in communication with the moving object 120A (YES in step S405), the display process is ended. Otherwise (NO in step S405), the processing returns to step S403 to continue the process. If the process is to be continued, a waiting period may be set so that the process from step S403 to step S405 is operated at a predetermined frequency (e.g., once per second).

The above-mentioned example is in which the position/orientation information about the moving object 120A in the process is displayed on the display apparatus 11. In some embodiments, position/orientation information about another moving object 120B on the network or position/orientation information about a plurality of moving objects 120 is displayed. In other embodiments, a history of the position/orientation information about the moving object 120A is stored on the RAM 104, providing a display of tracking movement.

<Process of Displaying Three-Dimensional Information>

Next, the three-dimensional information display process operated in step S402 will be described in detail. FIG. 5 is a flowchart illustrating details of the three-dimensional information display process.

In step S501, the three-dimensional feature point cloud acquisition unit 201 acquires feature points of the environment where the moving object 120A moves. The three-dimensional feature points are acquired feature point cloud data from the environment map data stored on the storage unit 105. In some embodiments, the three-dimensional feature points are detected from images to be acquired.

In step S502, the display data generation unit 202 generates feature points indicating edge portions of objects that becomes obstacles to the moving object 120A traveling in the environment from some corresponding points of the acquired feature point cloud. Specifically, the display data generation unit 202 extracts feature points suitable for projection onto the horizontal plane from the read feature point cloud. This process is roughly divided into three processes. First, the height distribution of the three-dimensional feature points is acquired. Second, peaks (outlier values, high-contrast ranges) are detected from the distribution. Third, data other than the three-dimensional feature points in the detected peaks is acquired as data for conversion.

The three-dimensional feature point cloud on the environment map data includes a mixture of points originating from walls, the floor, the ceiling, and the top surface of the object 301. With all the points projected onto the horizontal plane, feature points originating from the floor, the ceiling, and the top surface of the object 301 are also projected onto the floor surface and the region of the object 301, which is shorter in height than the moving object 120A. This sometimes makes it difficult to recognize the object 301 and the wall surface of the room 304 from the projection image.

Figure 6A:
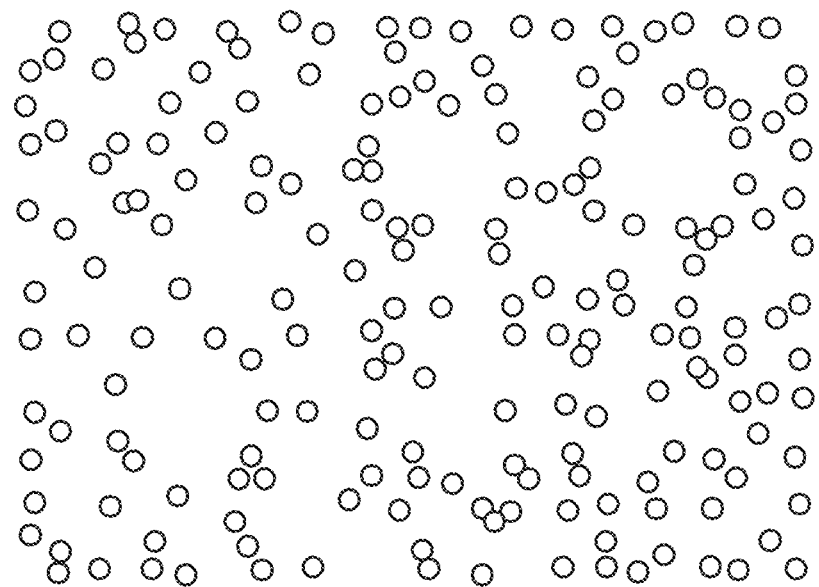
FIGS. 6A and 6B illustrate a distribution in a feature point cloud in a horizontal direction in a three-dimensional space.
Figure 6B:
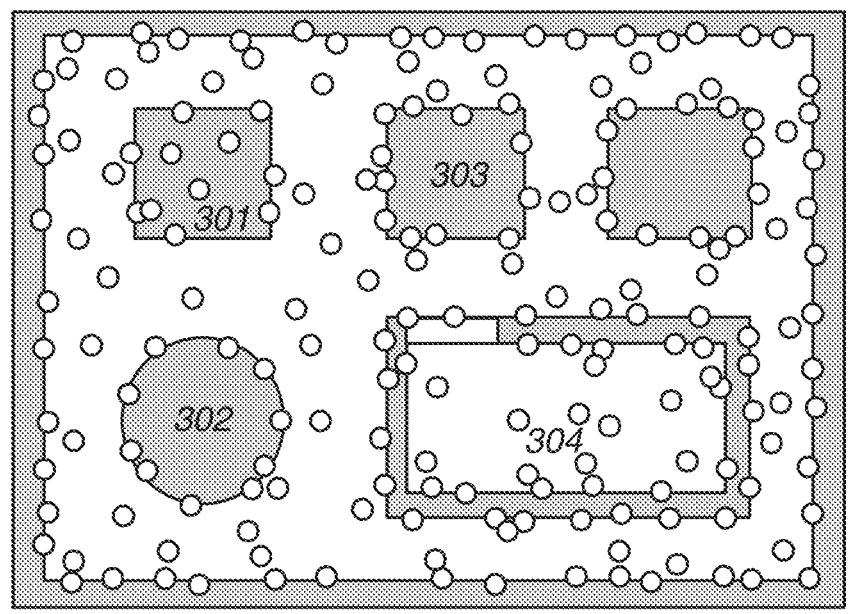

FIG. 6A illustrates an example where all the feature points in the environment map data are projected onto the horizontal plane. FIG. 6B illustrates the projected point cloud superimposed on the map image for description. In FIG. 6A, while the vacant places in the point cloud are found in the regions of the circular column 302 and the rectangular column 303, it is difficult to distinguish the object 301, the wall of the room 304, and travelable areas. To address this issue, recognizing a layout and extracting points suitable for identifying obstacles to the traveling are carried out before the point cloud projection. In the present exemplary embodiment, the points originating from the walls and the object 301 except for those originating from the ceiling or the floor are extracted as a feature point cloud for display. This provides to the user a highly visible display of showing a travelable range in the environment where the moving object 120A moves.

Figure 7:
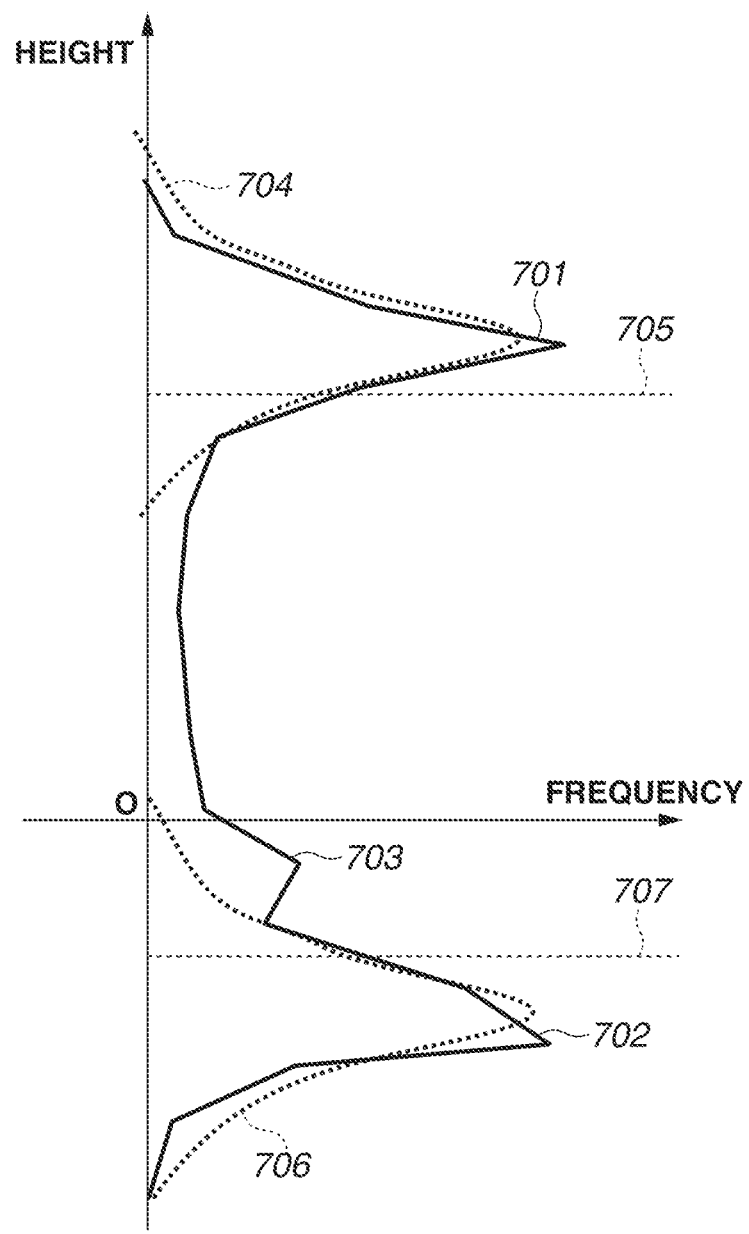
FIG. 7 is a frequency line graph illustrating a distribution in a feature point cloud in a height direction in a three-dimensional space.

In FIG. 7, the solid line represents the feature point distribution in the environment map in the frequency line graph in the height direction. The vertical axis shows height values, and the horizontal axis are frequency. The height value at the height of the image acquisition unit 211 of the moving object 120A is zero, and the ceiling is present in the positive direction whereas the floor is in the negative direction. Since the floor surface and the ceiling are substantially horizontal, the frequency distribution in the height direction has a peak 701 at the height corresponding to the ceiling and a peak 702 at the height corresponding to the floor surface. A low peak 703 indicates the feature points originating from the object 301.

After detecting peaks in the frequency distribution, the display data generation unit 202 approximates each detected peak using a Gaussian function. In FIG. 7, a dotted line 704 shows a result of the approximation of the ceiling-side peak, and a broken line 705 shows the height moved by half width at half maximum from the peak of the Gaussian function toward the origin point. Similarly, a dotted line 706 shows a result of the approximation of the ceiling-side peak, and a broken line 707 is the height moved by half width at half maximum toward the origin point. The display data generation unit 202 extracts feature points using the height of the broken line 705 as an upper limit and the height of the broken line 707 as a lower limit so that only the points originating from the walls and/or the object 301 are automatically extracted.

While the upper and lower limit values are set using the heights at half values of the Gaussian function, this is a mere example for description. For example, in order to exclude the feature points originating from the ceiling or the floor more, a height moved by full width at half maximum (twice the half width at half maximum) from each peak may be used as an upper limit value or a lower limit value. Further, in the detection of peak values, a method other than the approximation using the Gaussian function may be used which is, for example, the approximation using another function, use of a ceiling-side maximum frequency and a floor-side maximum frequency as class values, or the determination of a peak value or upper and lower limit values based on a user instruction via a GUI.

Figure 8A:
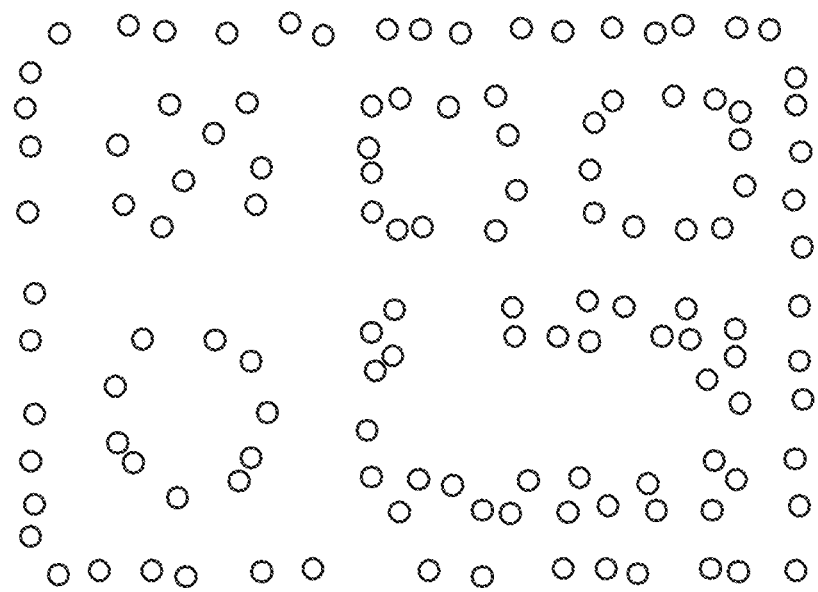
FIGS. 8A and 8B illustrate an example of a result of projecting display data.
Figure 8B:
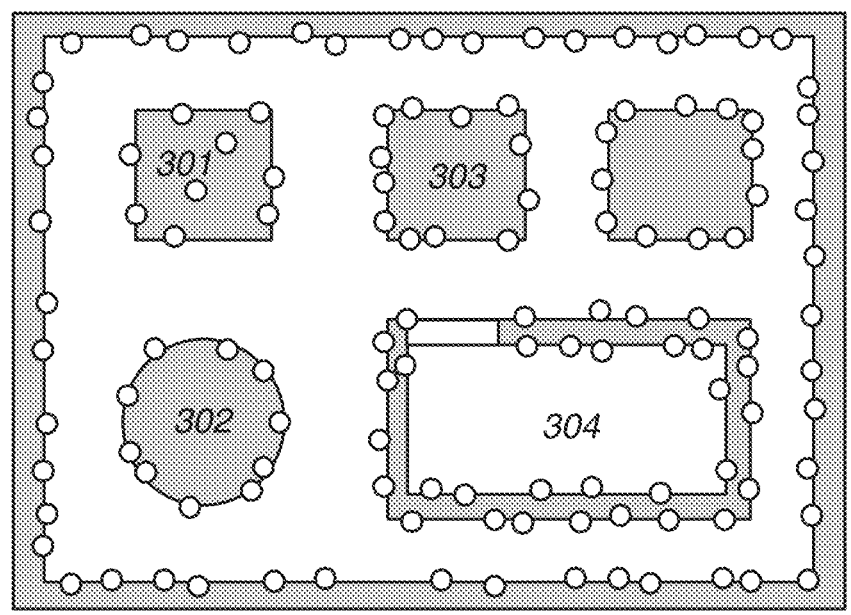

In step S503, the projection unit 203 projects a map and the position of the moving object 120A. On the map, the positions of feature points indicating edge portions of obstacles to the moving object 120A that is moving are plotted on the predetermined plane. Specifically, the feature point cloud for display extracted in step S502 is projected onto the horizontal plane to generate projection data. FIG. 8A illustrates a projection result. FIG. 8B illustrates the projected point cloud superimposed on FIG. 3 for description. It is easier to discriminate between obstacles and passages, i.e., boundary portions, in FIGS. 8A and 8B than in FIGS. 6A and 6B. In step S504, the output unit 204 displays the projection data on the display apparatus 112. For example, the feature points projected in the areas of the columns of the objects 302 and 303 are eliminated, and only other feature points indicating the outer edges of the columns are projected. Further, the feature points in the area of the object 301 remain because the object 301 is at a position lower than the ceiling. The feature points measured by the moving object 120A traveling inside the region 304 are projected as feature points indicating the wall of the region 304. Thus, it is easier to visually recognize the presence of a small room such as the region 304 than in the initial state. In addition, the map makes it clear that the moving object 120A can travel the inside of the region 304.

As described above, through the process illustrated in FIG. 5 operated in step S402, the information processing apparatus 101 provides information about positional relationships in the environment the user can intuitively understand on the display apparatus 112.

First Modified Example

While the feature point cloud output by the output unit 204 is extracted based on the peaks of the feature points in the height direction, any other methods may be used in combination to extract feature points to be displayed. For example, with a learning model for image recognition, a position of an object to be avoided by the moving object 120A or positions of feature points of the object may be output onto a map. Specifically, through a convolutional neural network (CNN), an object in the environment is detected from images captured by the image capturing apparatus mounted on the moving object 120A and what the object is output. A semantic segmentation technique may be used that indicates a region of the presence of an object in an image. With the techniques, for example, doors, glass windows, and/or walls are recognized. An opened door may not allow feature points of the door to be acquired from the three-dimensional measurement apparatus, creating a map showing nothing at the door. In this case, the recognition of the position of the door enables output of the position to the map. Further, for transparent objects such as transparent glass difficult to be measured by the three-dimensional measurement apparatus, a position that a transparent object is likely to be present is recognized using a learning model generated by learning features of transparent objects such as glass in advance. Such a combination of recognition processes as described above provides a more accurate travelable range of the moving object 120A to the user.

The information processing apparatus 101 and the information processing method according to the present exemplary embodiment allows the user to intuitively recognize with ease the positional relationship between objects and the presence of obstacles in the environment map on a screen display. Furthermore, the user can recognize the current position of the moving object 120A with ease using the screen display.

A second exemplary embodiment will be described. In the first exemplary embodiment, a method has been described of superimposing and displaying the display data generated from the feature point cloud in the environment map data on the position/orientation information about the moving object 120A. A method of using the display data however is not limited to that described above. In the present exemplary embodiment, a method will be described of using the generated display data to set a route of the moving object 120A. The configurations of the information processing apparatus 101 and the moving object 120A, the travel environment, and the environment map data according to the present exemplary embodiment are similar to those in the first exemplary embodiment, and redundant descriptions thereof will be omitted.

<Logical Configuration of Information Processing Apparatus>

Figure 10:
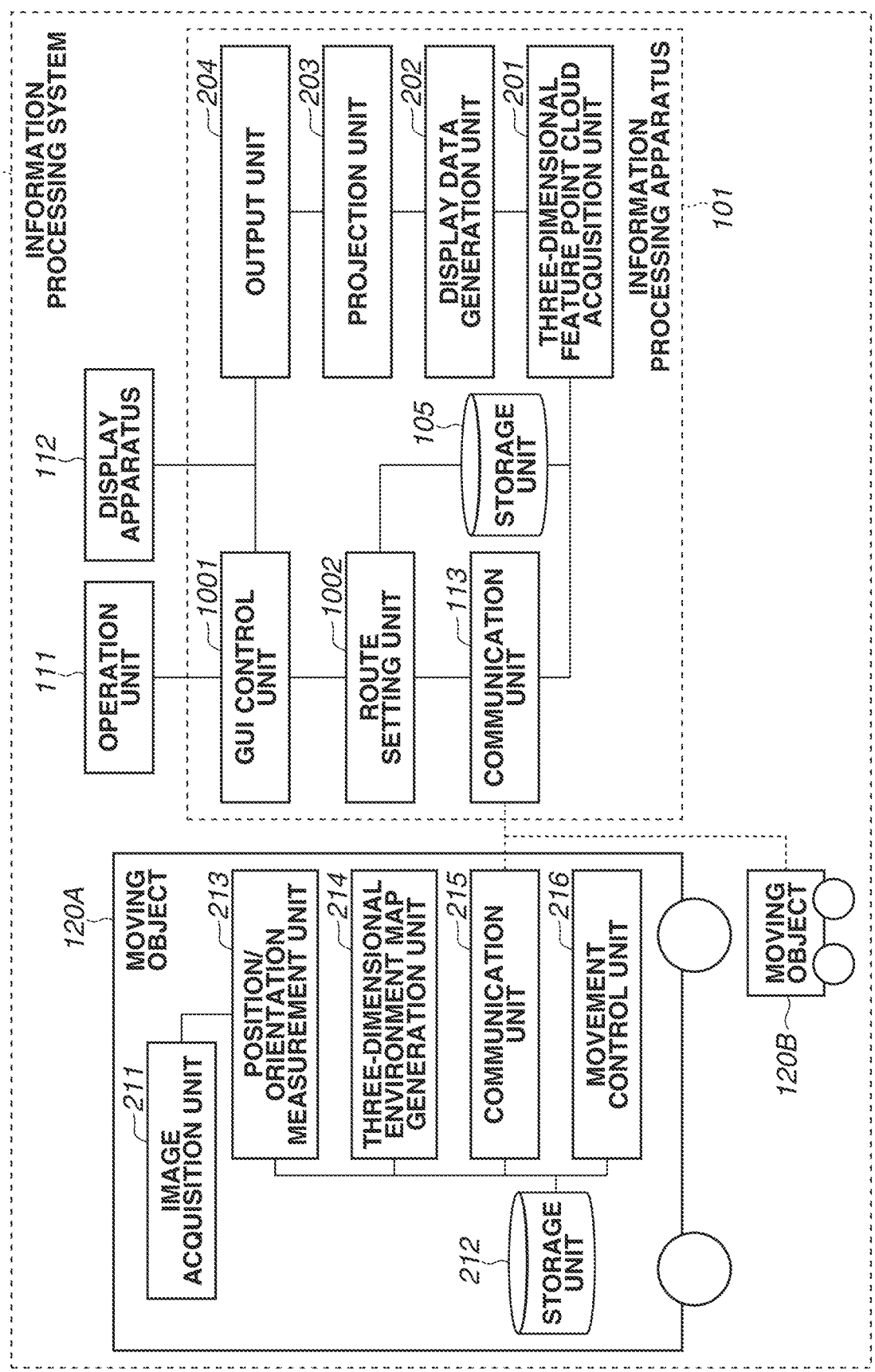
FIG. 10 is a block diagram illustrating an example of a function configuration of an information processing system.

FIG. 10 is a diagram illustrating a logical configuration of the information processing system 110 according to the present exemplary embodiment. A GUI control unit 1001 displays GUI components used for user instructions to the information processing system 110 on the display apparatus 112. Further, the GUI control unit 1001 receives user instructions to the information processing system 110 via the operation unit 111. A route setting unit 1002 generates route information containing coordinates of target points on the environment map based on a user instruction.

<Map Image>

The map image used in the present exemplary embodiment is a digital image of a layout in the horizontal direction in the travel space of the moving object 120A, the layout of which is highly visible for use by the user, or the map image is outline data from which the digital image can be rendered. Suitable examples include room floor plans and computer-aided design (CAD) drawings. The diagram illustrated in FIG. 3 will be referred to as an example of a map image.

<Route Setting Process>

Figure 11:
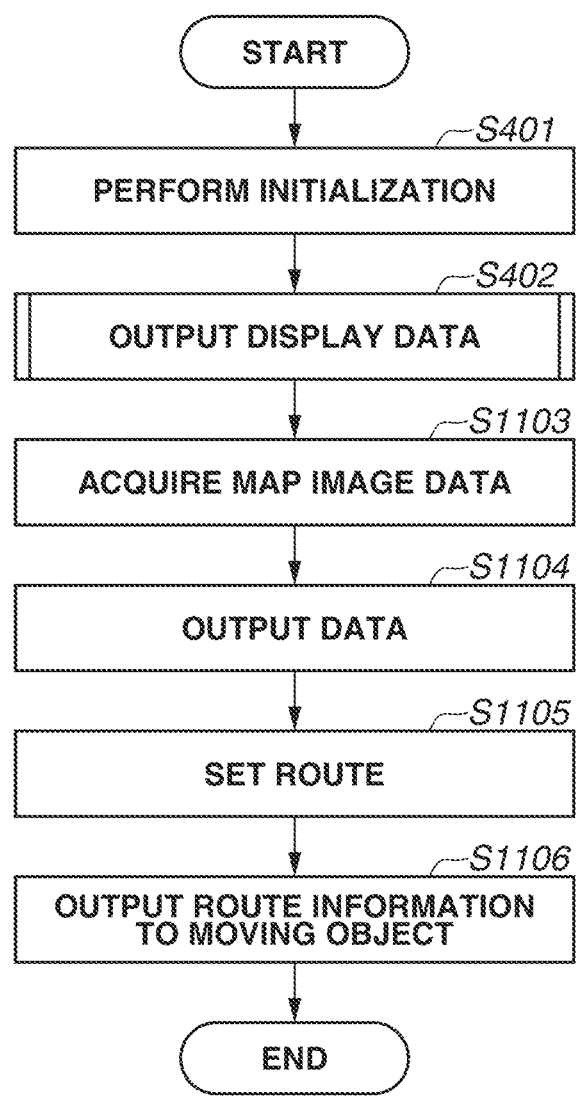
FIG. 11 is a flowchart illustrating a process that is operated by an information processing apparatus.

Next, a method will be described of setting a route of the moving object 120A in the information processing method using the information processing apparatus 101 according to the present exemplary embodiment. FIG. 11 is a flowchart illustrating a route setting process according to the present exemplary embodiment. Steps S401 and S402 are similar to those in the first exemplary embodiment, and redundant descriptions thereof will be omitted. In step S1103, the route setting unit 1002 reads the map image stored on the storage unit 105.

Figure 12:
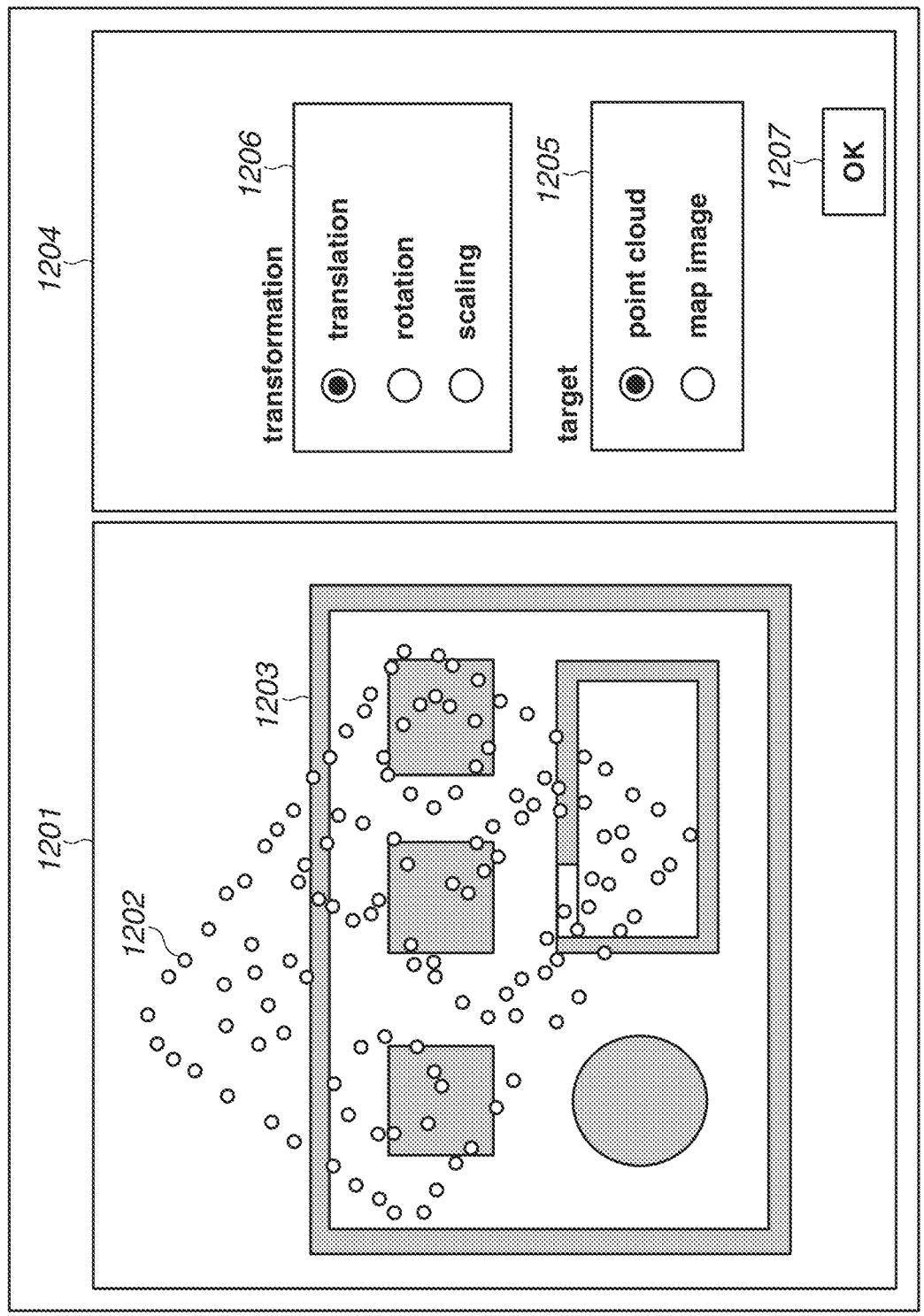
FIG. 12 illustrates an example of a graphical user interface (GUI).

In step S1104, the GUI control unit 1001 displays the display data and the map image on the screen and aligns both of them based on a user instruction. FIG. 12 illustrates an example of a GUI shown to the user for the alignment process. An image display area 1201 displays a projection data point cloud 1202 and a map image 1203. While the horizontal plane of the environment map data used in the present exemplary embodiment is defined, upward, downward, rightward, and leftward directions on the horizontal plane are not specifically defined, which may cause orientations of the display data and the map image on the horizontal plane not to match. Further, with undefined scales of the display data and the map image, the scales may not match. Besides, it is conceivable that aspect ratios of the environment map and the map image will not match depending on the accuracies of the environment map and the map image.

An area 1204 is an operation area that displays various buttons for use in alignment by the user. A button 1205 is a radio button set for selecting which of the radio buttons, either the projected point cloud (point cloud) or the map image (map image), is to be modified. A button 1206 is a radio button set for selecting a modification type. In the present exemplary embodiment, translation, rotation, and scaling are selectable. The user selects a modification target and a modification type and manipulates the modification target on the image display area 1201 using a pointing device such as a mouse so that the coordinates of the feature point cloud and the map image match as illustrated in FIG. 8B. A button 1207 is a button for ending the alignment process.

The modification types are not limited to those described above and may include shearing and distortion. In some embodiments, a plurality of control points are set on an object, which provides a more complicated process available, such as partial modifications. In other embodiments, modifications for alignment are performed automatically. For example, a region corresponding to a wall surface is extracted in a line from the map image by segment detection or outline extraction, and a modification parameter is calculated through optimization calculation to minimize the sum of the squares of the distance between the projection data point cloud and the wall surface extracted from the map image.

In step S1105, the route setting unit 1002 presents a route setting UI to the user via the GUI control unit 1001 and generates route data based on a user instruction.

Figure 13:
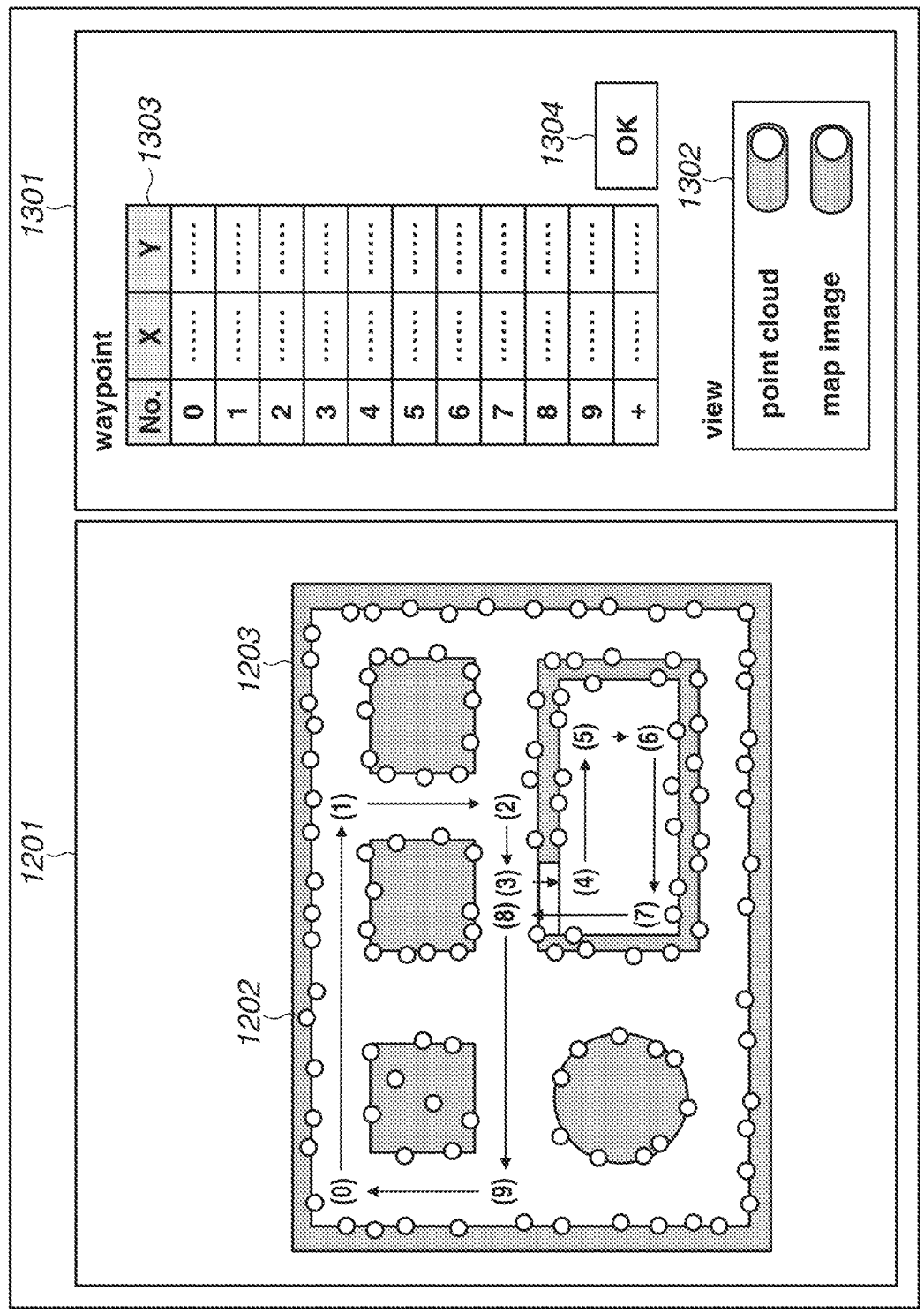
FIG. 13 illustrates an example of a GUI.

FIG. 13 illustrates a GUI in route setting. An area 1301 is an operation area that displays various buttons for use in route setting by the user. A button 1302 is a toggle button set for selecting whether to display the point cloud 1202 and/or the map image 1203 on the image display area. In FIG. 13, the point cloud 1202 and the map image 1203 are both displayed.

A list 1303 is a waypoint list that controls waypoints of routes. The numbers and coordinates of the waypoints are displayed as an example. Further, the coordinates of the waypoints are shown each by a bracketed number corresponding to the number of the waypoint on the image display area 1201. Arrows connect the waypoints in numerical order and collectively show a route on which the moving object 120A autonomously travels. The number of waypoints is settable to any number, and, for example, if the user presses the portion "+" of the waypoint list 1303, a new waypoint is added.

A button 1304 is a button for ending the route setting. If the user issues an instruction to end the route setting, the route setting unit 1002 acquires the coordinates of the waypoints on the GUI. After that, the coordinates of the waypoints are converted into those of the coordinate system of the environment map based on the parameters of the modification process performed on the projection data by the user in step S1104, and route data is generated usable in combination with the environment map data.

In step S1106, the route setting unit 1002 transmits the route data to the moving object 120A. The moving object 120A stores the received route data in the storage unit 212 of the moving object 120A. The environment map data stored on the storage unit 212 allows the moving object 120A to autonomously travel based on the received route data.

In some embodiments, the route setting unit 1002 transmits a set of route data and environment map data to the other moving object 120B. That also allows the moving object 120B to autonomously travel based on the route data and the environment map data that have been received.

Modified Examples

The present exemplary embodiment is also implemented by performing the route setting process and the three-dimensional information display process on a moving object.

<Configuration of Moving Object>

Figure 17:
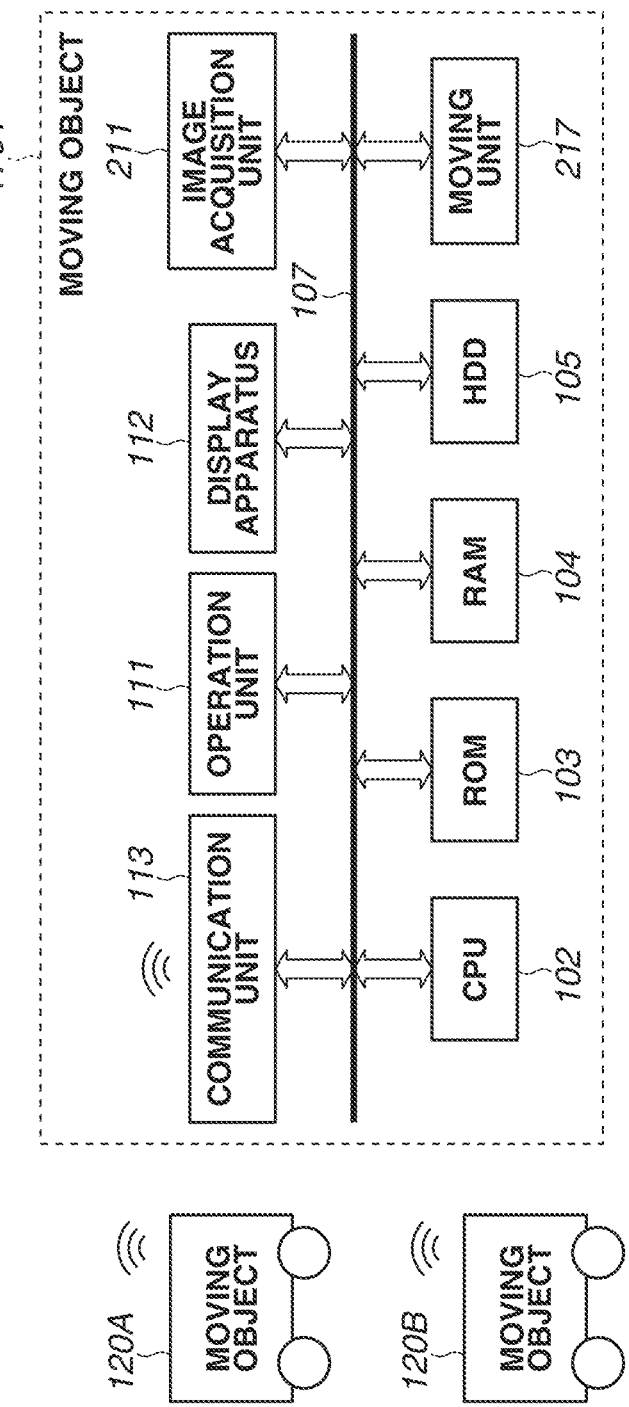
FIG. 17 is a block diagram illustrating an example of a hardware configuration of an information processing apparatus.

FIG. 17 is a diagram illustrating an example of a configuration of a moving object 1701 according to the present exemplary embodiment. The moving object 1701 includes the image acquisition unit 211 and a moving unit similar to the moving object 120A in addition to the functionality of the information processing system 110.

<Logical Configuration of Information Processing Apparatus>

A logical configuration of the moving object 1701 will be described. FIG. 18 is a block diagram illustrating a logical configuration of the moving object 1701. The operation of each component is similar to that of the information processing apparatus 101, the information processing system 110, or the moving object 120A described in the second exemplary embodiment, and redundant descriptions thereof will be omitted.

<Route Setting Method>

The environment map data display process and the moving object route setting process in the information processing method using the moving object 1701 according to the present exemplary embodiment are similar to those described in the second exemplary embodiment, and detailed descriptions thereof will be omitted. Besides, in step S401, the environment map data may be acquired from the storage unit 105 of the moving object 1701. Further, in step S1106, the route information may be stored on the storage unit 105 of the moving object 1701 instead of transmitting the route information.

The information processing apparatus 101 and the information processing method according to the present exemplary embodiment allows the user to intuitively recognize with ease the positional relationship between objects and the presence of obstacles in the environment map on a screen display. Further, the use of the screen display facilitates the moving object route setting.

A third exemplary embodiment will be described. In the first exemplary embodiment, the method has been described in which a point cloud suitable for projection onto the horizontal plane is extracted from the feature points in the environment map data based on the distribution in the height direction. However, if the environment has a more complicated structure, such as, a plurality of ceilings with different heights in the environment or sloped ceilings, discriminating between such ceilings and other objects may be difficult with the distribution in the height direction alone. In the present exemplary embodiment, a method will be described of performing annotation and plane approximation on the feature points in the environment map data to extract information suitable for projection onto the horizontal plane.

The configurations of the information processing apparatus 101 and a moving object, the environment, and the environment map according to the present exemplary embodiment are similar to those in the first exemplary embodiment, and redundant descriptions thereof will be omitted. However, a case will be taken into consideration where some of the feature points to be displayed are not successfully detected on images due to objects from which acquiring feature points is difficult, such as transparent objects or objects with repeated patterns, in the environment according to the present exemplary embodiment. Besides, the three-dimensional information display process according to the present exemplary embodiment is similar to that in the first exemplary embodiment except for the display data generation process in step S502, and redundant descriptions thereof other than the display data generation process in step S502 will be omitted.

In addition, the three-dimensional information display process according to the present exemplary embodiment is also applicable to the moving object position/orientation information display process according to the first exemplary embodiment and the moving object route setting process according to the second exemplary embodiment.

<Three-Dimensional Information Display Process>

A process operated by the information processing apparatus 101 according to the present exemplary embodiment of the present disclosure will be described with reference to FIGS. 14, 15, 16A, and 16B.

Figure 14:
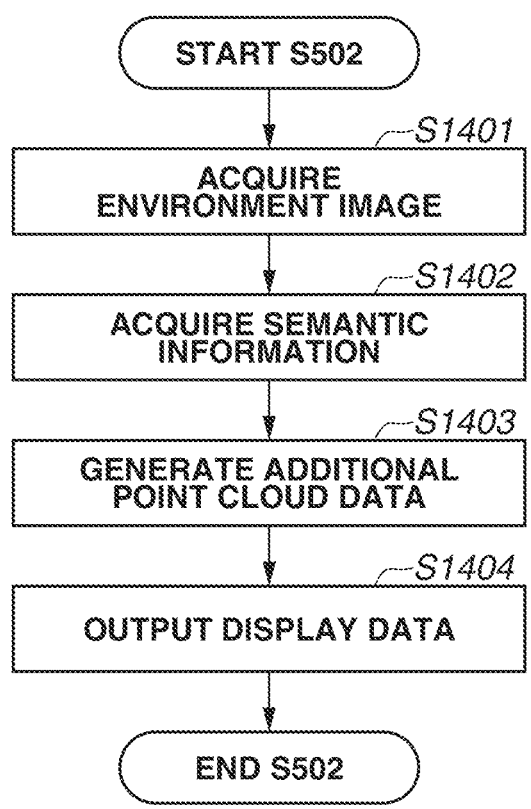
FIG. 14 is a flowchart illustrating a process that is operated by an information processing apparatus.

FIG. 14 is a flowchart illustrating details of the process of step S502 operated by the information processing apparatus 101 according to the present exemplary embodiment.

In step S1401, the display data generation unit 202 acquires an environment image from the environment map on the storage unit 105. Specifically, the display data generation unit 202 acquires an image captured in the environment from a keyframe group in the environment map and data with combined camera parameters in the image capturing.

In step S1402, the operation unit 111 receives a user-instructed input annotation of the assignment surface on which a feature point is plotted in the environment map using an environment image acquired from the environment map.

FIG. 15 illustrates an example of a GUI that performs an annotation operation. An environment image display area 1501 displays the environment image. A projection image display area 1502 displays the feature points projected on the horizontal plane and the position and orientation of the camera. An operation area 1503 displays various buttons for use in annotation operation by the user.

An area 1504 is provided with a pull-down menu for selecting an operation target environment image. The number corresponding to each keyframe in the environment map is selectable. The environment image display area 1501 displays the environment image of the selected keyframe and the feature points on the image. Further, the projection image display area 1502 displays the position and orientation and an angle of view 1508 in capturing the environment image.

A list 1505 is an assignment surface list that manages assignment surfaces on which the user has performed an annotation process. Two assignment surfaces Nos. 0 and 1 are displayed as an example. The column "color" specifies a display color in the environment image display area 1501. For example, a region 1509 is a region selected as the assignment surface No. 0 by the user, and a region 1510 divided into two is a region selected as the assignment surface No. 1 by the user.

The column "cut" shows whether to exclude a corresponding assignment surface in the projection onto the horizontal plane and each assignment is selectable by the user. In FIG. 15, the assignment surface No. 0 is the wall surface of the rectangular column 303. The assignment surface No. 0 is suitable for projection and is thus set to be not excluded ("NO"). On the other hand, the assignment surface No. 1 is the ceiling and is thus set to be excluded in the projection ("YES"). The number of assignment surfaces is settable to any, and a new assignment surface is added when the portion "+" in the list is pressed by the user.

An area 1506 is an area of buttons for selecting an operation on the assignment surface. The area 1506 displays a pull-down menu for selecting an operation target assignment surface and a radio button set for selecting whether to add or erase a region. In FIG. 15, a mode of adding a region of the assignment surface No. 0 is selected, and in this state, the corresponding assignment surface in the environment image display area 1501 is painted using the pointing device such as a mouse to thereby select the region as illustrated by the region 1509.

A button 1507 is a button for ending the annotation process. If the user presses the button 1507, the processing proceeds to step S1402.

In step S1403, the display data generation unit 202 associates the feature points with the assignment surfaces and generates approximation planes. For example, the assignment surface No. 0 is associated with four feature points on the region 1509, and an approximation plane is calculated from the three-dimensional coordinates of the four feature points. Further, the size of the approximation plane is determined based on the size of the region 1509. In the approximation, a constraint condition of being horizontal or being perpendicular to the horizontal plane is applicable according to a user instruction based on a GUI (not illustrated). In some embodiments, a constraint condition about a shape such as a surface or a side surface of a cylinder is applicable.

In step S1404, the display data generation unit 202 extracts a surface suitable for projection and feature points. In the present exemplary embodiment, the display data generation unit 202 extracts an approximation plane corresponding to the assignment surface not set as an exclusion target in step S1403 and a feature point cloud corresponding to the approximation plane as display data. Feature points of the feature point cloud corresponding to the approximation plane are selected based on the distance threshold values from the approximation plane and a selected feature point cloud does not always match the feature point cloud associated with the assignment surface that is the source of the approximation plane. Further, if there is a plurality of approximation planes within the distance threshold value for a feature point, the feature point will be associated with the closest approximation plane. In some embodiments, an approximation plane corresponding to the assignment surface as an exclusion target and the point cloud corresponding to the approximation plane are excluded from all the approximation planes and all the points, and the remaining data is extracted as display data.

Figure 16A:
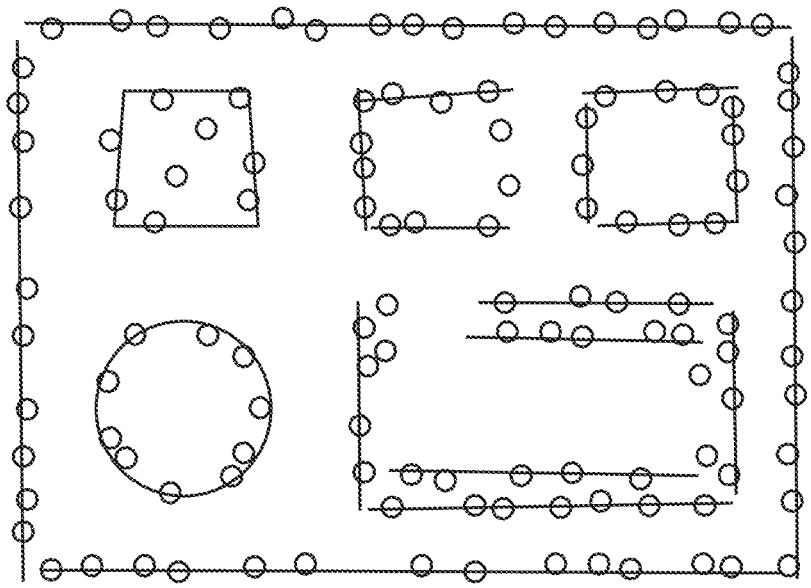
FIGS. 16A and 16B illustrate an example of a result of projecting display data.

FIG. 16A illustrates a result of projecting the surface and the point cloud data extracted in step S1403 described above in step S503. A typical shape of a surface in a three-dimensional space projected onto a plane is planar, but the projected shape is a segment-like shape because the extracted approximation plane is substantially perpendicular to the projection plane. In the present exemplary embodiment, for simple description, the shape of the surface projected by the projection unit 203 is approximated to a segment, and the projection result is displayed as the segment in FIG. 16A. In some embodiments, the shape of the projection plane is displayed directly.

Figure 16B:
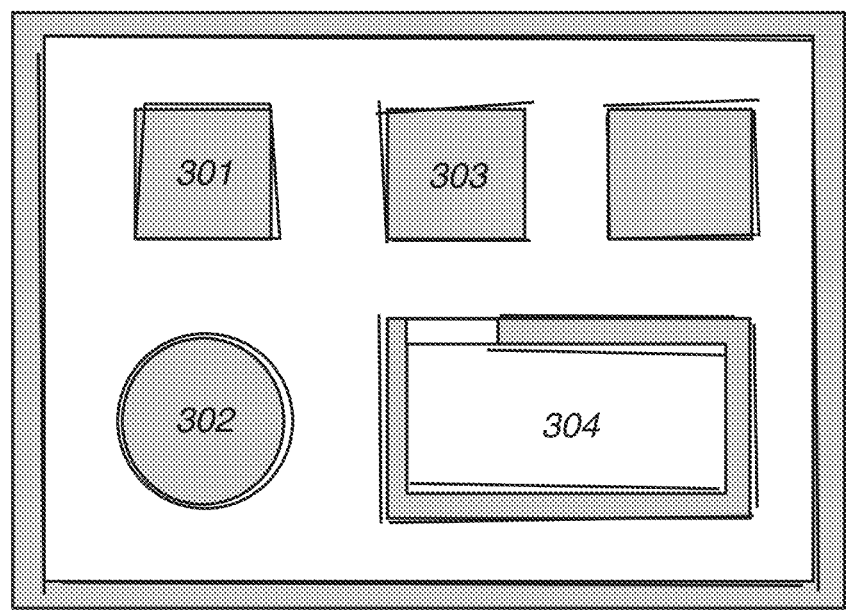

Besides, an approximation plane may not be generated, for example, with less than three feature points associated with a certain surface of the rectangular column 303 under no constraint conditions. In this case, the surface is not displayed on the projection plane. In FIG. 16B, the segments obtained by projecting the extracted surfaces are superimposed on FIG. 3.

It is possible that the positions of feature points in a region containing a transparent object such as glass are not detected accurately. For such a region, an annotation indicating that an object is a transparent object is input. If the region is in an image capturing range, a predetermined index (e.g., a sign indicating that a glass wall is in the region) can be displayed. For doors, an annotation indicating that an object is a door can be input. In this case, feature points contained in a captured image varies with the door opened or closed. In order to respond to such a change in a region where there is a door or a moving object, an index indicating that there is a door in the region may be displayed at a position corresponding to the position of the door. The user inputs an annotation indicating the presence of the door in the region where the door exists using the above-described GUI. The output unit 204 outputs an index (e.g., a door icon) indicating the presence of the door in the region for the annotation indicating the presence of the door. Inputting such an annotation as described above allows the user to add supplementary information about the environment, providing a highly visible map display.

As described above, the information processing apparatus 101 and the information processing method according to the present exemplary embodiment provides a screen display of the positional relationship between objects and the presence of obstacles even in a complicated environmental structure in the environment map, the positional relationship of which is intuitively recognizable with ease by the user.

Other Exemplary Embodiments

In the first exemplary embodiment, the method has been described in which a point cloud extracted from a feature point cloud in environment map data is projected onto a horizontal plane and displayed. A feature point cloud acquisition method in the present exemplary embodiment is not limited to that described above. For example, with a sparse distribution of feature points in an environment map or a low proportion of feature points originating from walls and/or obstacles, in some cases, a acquired visible point cloud is not enough in projection. In those cases, a denser point cloud may be generated from environment map data. Specifically, data containing a combination of an image captured in the environment with the camera parameters in the image capturing is acquired from a keyframe group in the environment map data. Then, denser point cloud data about, for example, wall surfaces, obstacles, ceilings, and floors is acquired by a known multi-view stereo (MVS) method (e.g., Yasutaka Furukawa and Jean Ponce, Accurate, Dense, and Robust Multi-View Stereopsis, PAMI 2008).

Other methods of generating dense point cloud data can be employed as long as they provide a point cloud with accuracy that is denser than a feature point cloud in the environment map and that is visually sufficient in amount in the projection. Further, with a less accurate or insufficient point cloud generated, a method may be used of adding other feature points to the point cloud through detection of feature points and search for their corresponding points, for example. Other than the method, a known semi-global matching (SGM) method may be used of generating a dense depth image from data about the position and the orientation in each keyframe and converting each pixel into a three-dimensional point based on the camera parameters and the depth value. For a depth camera as the image acquisition unit 211, a similar process is applied.

Further, in the projection process performed after the display data generation in the first exemplary embodiment, a changed order of the display data generation process and the projection process is applicable. In the first exemplary embodiment, for example, the display of each point may be switched to non-display of it and vice versa following the settings of upper limits and lower limits, after data about all the projected points including the points originating from floors, ceilings, and the top surface of the object 301 is generated in advance. For screen display updates in response to adjustments of upper and lower limits based on user instructions in particular, switching between the display and non-display of the projected feature points simply reflects a result of the adjustment promptly.

Besides, although the moving objects 120A and 120B are separate objects but have the same configuration in the first exemplary embodiment, they may have different configurations. For example, the moving object 120A may be an apparatus that has no autonomously moving functionality and that is dedicated to generating three-dimensional environment maps. Further, the moving object 120A can be an apparatus that does not include the movement control unit 216 or the moving unit and that generates three-dimensional environment maps while being held and carried by the user. For example, the moving object 120A according to the present exemplary embodiment is a tablet personal computer (tablet PC) with a camera attached thereto. On the other hand, the moving object 120B may be an apparatus that does not include the three-dimensional environment map generation unit 214 and that receives three-dimensional environment maps and route information from other apparatuses to autonomously travel.

Further, the moving object 1701 according to the second exemplary embodiment may be an apparatus for generating three-dimensional environment maps without the autonomous moving functionality, like the moving object 120A. Similarly, the moving object 1701 may be an apparatus that does not include the movement control unit 216 or the moving unit and that generates three-dimensional environment maps while being held and carried by the user.

Other than those above, the moving object 1701 may be an apparatus that does not include the three-dimensional environment map generation unit 214 and that sets route information after acquiring a three-dimensional environment map from other apparatuses to autonomously travel.

Besides, although the moving objects 120 and 1701 in the above-described exemplary embodiments are assumed to travel on floors that are substantially horizontal, the present exemplary embodiments are also applicable to a moving object that travels on any other surfaces and a moving object capable of traveling three-dimensionally. For example, for a moving object traveling on wall surfaces, a projection plane can be a plane perpendicular to the ground. In another example, for a moving object traveling on the wall surface of a cylindrical column, a curved, projection may be performed with the cylindrical surface as a projection plane and using polar coordinates. In this case, it is suitable to use a flattened projection plane on the display on the GUI. When a moving object capable of traveling three-dimensionally is used, it is suitable to display the height (coordinates in the direction perpendicular to the projection plane) of the current position of the moving object on the screen and to provide a UI for setting a height for each target point in the route setting.

Besides, the method of using plane approximation on feature points based on a user annotation in the third exemplary embodiment is not limiting, and a method with no user annotation may be used. For example, using a method such as a known random forest method, a process may be employed of dividing a feature point cloud into a plurality of groups and performing plane approximation on each group.

Besides, for the display data generation process, feature points and surface display data may be extracted based on height values from the surface on which a moving object mainly travels and on the orientation of the plane associated with each feature point as in the first exemplary embodiment.

The processes can be performed using a trained model acquired by machine learning in place of the display data generation unit 202 and the three-dimensional feature point cloud acquisition unit 201 among the above-described processing units. In this case, for example, a plurality of combinations of input data to the processing unit and output data of the processing unit is prepared as training data, and machine learning is performed by acquiring knowledge from the combinations. Through that process, a trained model is generated that outputs output data as a result in response to input data based on the acquired knowledge. The trained model can be, for example, a neural network model. Then, the trained model performs the processes of the processing units by operating as a program for executing processes similar to those of the processing units in cooperation with a CPU or a graphical processing unit (GPU). The trained model may be updated after having performed certain processes as appropriate.

Furthermore, embodiments of the present disclosure are implemented also by executing the following process. Specifically, the process is a process that is operated by the program read by the system or a computer (or CPU or a micro-processing unit (MPU)) after software (program) for performing the functions of the above-described exemplary embodiments is fed to a system or an apparatus via a network for data communication or various types of storage media. Further, the program may be recorded in a computer-readable recording medium and provided. In the present disclosure, a storage medium storing the above-described computer program may be employed. There are various methods available for feeding the computer program of the present disclosure. Among them, a case of distributing the computer program via a network such as the Internet and a case of distributing the program that is encrypted or divided are also encompassed within the scope of the present disclosure.

According to the present disclosure, a three-dimensional measurement result measured by a moving object including a three-dimensional measurement apparatus can be displayed so that a user can view the result with ease.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-082424, filed May 8, 2020, which is hereby incorporated by reference herein in its entirety.

What is claimed is:

1. An information processing apparatus comprising:
one or more processors; and
at least one memory storing executable instructions, which when executed by the one or more processors, cause the information processing apparatus to:
acquire a feature point cloud indicating a three-dimensional shape of an environment including a ceiling where a moving object moves;
exclude, from the feature point cloud of the environment, feature points of the ceiling based on a peak, in a height direction, detected from a distribution of feature points in the height direction; and
output a two-dimensional map indicating positions of feature points on a two-dimensional plane excluding the feature points of the ceiling.

2. The information processing apparatus according to claim 1, wherein the executable instructions, when executed by the one or more processors, cause the information processing apparatus to output a position of the moving object to the two-dimensional map.

3. The information processing apparatus according to claim 1, wherein the executable instructions, when executed by the one or more processors, cause the information processing apparatus to acquire a three-dimensional position in the feature point cloud based on image data on the environment around the moving object that is captured by an image capturing apparatus.

4. The information processing apparatus according to claim 1, wherein the executable instructions, when executed by the one or more processors, cause the information processing apparatus to acquire a three-dimensional position in the feature point cloud based on three-dimensional point cloud data acquired by measuring the environment around the moving object using a range sensor.

5. The information processing apparatus according to claim 1, wherein the executable instructions, when executed by the one or more processors, cause the information processing apparatus to:
store a three-dimensional map indicating the positions of the feature points in the environment; and
acquire the positions of the feature points based on the three-dimensional map.

6. The information processing apparatus according to claim 1, wherein the executable instructions, when executed by the one or more processors, cause the information processing apparatus to display the two-dimensional map on a display apparatus.

7. The information processing apparatus according to claim 1, wherein the executable instructions, when executed by the one or more processors, cause the information processing apparatus to receive a designation of a travel route of the moving object with respect to the two-dimensional map.

8. The information processing apparatus according to claim 1, wherein the executable instructions, when executed by the one or more processors, cause the information processing apparatus to:
  recognize a predetermined object based on the feature point cloud indicating the three-dimensional shape of the environment where the moving object travels; and
  output a position of the recognized object to the two-dimensional map.

9. The information processing apparatus according to claim 8, wherein the executable instructions, when executed by the one or more processors, cause the information processing apparatus to:
  recognize a door as the predetermined object; and
  indicate a position of the recognized door on the two-dimensional map.

10. The information processing apparatus according to claim 8, wherein the executable instructions, when executed by the one or more processors, cause the information processing apparatus to:
  recognize a transparent object as the predetermined object; and
  output a position of an edge portion of the transparent object to the two-dimensional map.

11. The information processing apparatus according to claim 8, wherein the information processing apparatus includes a learning model to detect the predetermined object from the feature point cloud indicating the three-dimensional shape of the environment where the moving object travels.

12. An information processing method comprising:
  acquiring a feature point cloud indicating a three-dimensional shape of an environment including a ceiling where a moving object travels;
  excluding, from the feature point cloud of the environment, feature points of the ceiling based on a peak, in a height direction, detected from a distribution of feature points in the height direction; and
  outputting a two-dimensional map indicating positions of feature points on a two-dimensional plane excluding the feature points of the ceiling.

13. A non-transitory computer-readable storage medium storing a computer-executable program for causing a computer to perform the method according to claim 12.

14. The information processing apparatus according to claim 1, wherein the executable instructions, when executed by the one or more processors, cause the information processing apparatus to acquire a height distribution of three-dimensional feature points, detect peaks from the height distribution, acquire data other than the three-dimensional feature points at a peak with a highest height value among the detected peaks as data for conversion, and project the acquired data onto a horizontal plane to generate projection data.

* * * * *